United States Patent [19]
Sumimoto

[11] Patent Number: 5,813,016
[45] Date of Patent: Sep. 22, 1998

[54] DEVICE/SYSTEM FOR PROCESSING SHARED DATA ACCESSED BY A PLURALITY OF DATA PROCESSING DEVICES/SYSTEMS

[75] Inventor: Shinji Sumimoto, Kawasaki, Japan

[73] Assignee: Fujitsu Limited, Kawasaki, Japan

[21] Appl. No.: 602,367

[22] Filed: Feb. 16, 1996

[30] Foreign Application Priority Data

Mar. 1, 1995 [JP] Japan .................................. 7-041895

[51] Int. Cl.$^6$ .................................................. G06F 13/00
[52] U.S. Cl. .............................. 707/201; 707/203; 707/8
[58] Field of Search .................................. 395/617, 619, 395/712, 608, 610, 474, 475; 707/201, 203, 8, 10; 711/147, 150, 152

[56] References Cited

U.S. PATENT DOCUMENTS

| | | | |
|---|---|---|---|
| 4,627,019 | 12/1986 | Ng | 395/608 |
| 5,077,658 | 12/1991 | Bendert et al. | 395/601 |
| 5,129,082 | 7/1992 | Tirfing et al. | 395/603 |
| 5,212,789 | 5/1993 | Rago | 395/608 |
| 5,247,672 | 9/1993 | Mohan | 395/479 |
| 5,261,069 | 11/1993 | Wilkinson et al. | 395/472 |
| 5,280,612 | 1/1994 | Lorie et al. | 395/608 |
| 5,333,310 | 7/1994 | Sakai | 395/608 |
| 5,369,763 | 11/1994 | Biles | 395/603 |
| 5,386,554 | 1/1995 | Nozaki | 395/618 |
| 5,544,353 | 8/1996 | Forman et al. | 395/608 |
| 5,551,046 | 8/1996 | Mohan et al. | 395/800 |
| 5,588,143 | 12/1996 | Stupek, Jr. et al. | 395/500 |

Primary Examiner—Paul V. Kulik
Attorney, Agent, or Firm—Staas & Halsey

[57] ABSTRACT

In accessing shared data in a shared storage device from a plurality of systems, the access is prevented from concentrating on one system without the necessity of exclusive control such as a lock mechanism, etc. Predetermined shared data in a network is all updated by a predetermined shared data updating unit in a first data processing device. The update result is written by a version data writing unit to the update storage device. If the predetermined shared data is referred to in the predetermined shared data referring unit in the second data processing device, the referring operation is performed by the predetermined shared data reference control unit on the predetermined shared data of one version prior to the latest version in the shared storage device, thereby requiring no lock mechanism.

11 Claims, 16 Drawing Sheets

| FILE SYSTEM POSITION | UPDATE BUFFER POSITION | DATA LENGTH | UPDATE FLAG |
|---|---|---|---|
| DISK1: TRAK1000 SEC1 | DISK1: TRAK1: SEC1 | BLOCK3: | BEING UPDATED |
| DISK1: TRAK1010 SEC1 | DISK1: TRAK1: SEC10 | BLOCK3: | UPDATE COMPLETED DELAYED BEING UPDATE |
| | | | |

FIG. 5

DEVICE/SYSTEM FOR PROCESSING SHARED DATA ACCESSED BY A PLURALITY OF DATA PROCESSING DEVICES/SYSTEMS

BACKGROUND OF THE INVENTION

1. Field of the Invention

The present invention relates to a system of referring to and updating shared data in a shared storage device for use by a plurality of systems such as a plurality of host devices, etc. which require high reliability and throughput.

2. Description of the Related Art

There are various system in which a plurality of systems can share data (shared data) stored in one storage device (shared storage device).

The first conventional system for using, among a plurality of systems, shared data stored in a shared storage device, is a client/server system. In this system, a shared storage device is connected to a server device. A client device issues an access request to the server device when it tries to access the shared data stored in the shared storage device. The server device accepts access requests from client devices or from itself sequentially or in a predetermined priority order, and accesses the shared storage device in response to each access request. Practically, the most popular system is the client/server system of, for example, a network file system (NFS).

However, since the server device receives a great number of requests to access the shared storage device from the client devices, according to the first conventional system, the server device has a large work load imposed on it, thereby lowering the performance of accessing the shared storage device.

Furthermore, if a failure occurs in the server device, the client devices cannot access the shared storage device according to the first conventional system.

To solve the above described problems with the client/server system, a multiplexed system with a lock mechanism such as a distribution lock manager, etc. is known as the second conventional system. In this system, a plurality of host devices are connected to the shared storage device via, for example, SCSI buses. The host device sets a lock on the shared data when it accesses the shared data stored in the shared storage device. Thus, access from other host devices to the locked shared data is restricted. When this access to the shared data terminates, the lock on the shared data is released. Therefore, access contention, for example, when simultaneously updating the same shared data by a plurality of host devices, can be avoided.

However, according to the second conventional system using the lock mechanism, each host device should communicate with other host devices relating to the lock, prior to accessing the shared data, and also should perform a control process to lock the shared data. As a result, additional overhead is required to lock the shared data in accessing the shared data stored in the shared storage device according the second conventional system, thereby lowering the accessing performance to the shared storage device.

Additionally, a deadlock state can occur according to the second conventional device with the lock mechanism, when process A in host device A accesses the first shared data stored in the shared storage device and locks the first shared data, while process B in host device B accesses the second shared data stored in the shared storage device and locks the second shared data, and when process A waits for the release of the lock on the second shared data while process B waits for the release of the lock on the first shared data, that is, when both processes cannot get out of their waiting states. Therefore, a deadlock preventing mechanism is needed and requires an additional overhead for this mechanism according to the second conventional system.

SUMMARY OF THE INVENTION

The present invention aims at preventing accessing from concentrating on one system when a plurality of systems access shared data stored in a shared storage device, and also at removing the necessity for exclusive control by a lock mechanism, etc.

According to the present invention, a plurality of data processing devices share a bus through which they access a shared storage device and an update storage device, and are connected to one another through a network in a shared data processing system.

First, the following units are provided in the first data processing device, consisting of at least one of the plurality of data processing devices.

That is, a first predetermined shared data access control unit receives requests through a network from data processing devices to a shared storage device to update predetermined shared data, or requests from its own data processing device to update the predetermined shared data.

A predetermined shared data updating unit updates predetermined shared data in response to a request to update the predetermined shared data received by the first predetermined shared data access control unit.

A version data writing unit writes a version of the predetermined shared data updated by the predetermined shared data updating unit to the update storage device.

A delayed update unit writes a predetermined version of a predetermined shared data stored in the update storage device at a predetermined time to the shared storage device at a storage position corresponding to the predetermined shared data.

A first update state management unit manages the update state of the predetermined shared data in the update storage device.

An update state notification unit notifies a plurality of data processing devices through the network of the update state of the predetermined shared data stored in the update storage device managed by the first update state management unit.

Next, the following units are provided in the second data processing device, consisting of at least one of the plurality of data processing devices.

That is, when a request to access the shared storage device is issued from the data processing device in a second predetermined shared data access control unit to update predetermined shared data, the second predetermined shared data access control unit sends the request to update the predetermined shared data to the first data processing device through the network. If the access request is issued to refer to the predetermined shared data, the second predetermined shared data access control unit accepts the request to refer to the predetermined shared data.

A predetermined shared data referring unit refers to predetermined data in response to the request to refer to the predetermined shared data accepted by the second predetermined shared data access control unit.

A second update state management unit manages the update state, received from the first data processing device through the network, of the predetermined shared data stored in the update storage device.

A predetermined shared data reference control unit issues from the second data processing device directly through the bus a request to refer to the predetermined shared data, by the predetermined shared data referring unit, stored in either the shared storage device or update storage device depending on the update state of the predetermined shared data in the update storage device managed by the second update state management unit.

With the above described configuration of the present invention, the first data processing device can be designed to contain all functions of a second data processing device.

The request to update the predetermined shared data can be generated as a request to update, not the file data in the file system in the shared storage device, but the system data (directory data, i-node of the directory and the file) regulating the structure of the file system.

Otherwise, the request to update the predetermined shared data can be generated as a request to update either the file data in the file system in the shared storage device or the system data regulating the structure of the file system.

As the second aspect of the present invention based on the above described configuration, a recovery unit can also be included to restore the predetermined shared data in the shared storage device to its original state by using the predetermined shared data stored in the update storage device, when a fault occurs in the first data processing device.

As the third aspect of the present invention based on the above described configuration, a version data accessing unit can also be included to access any version of plural versions of predetermined shared data stored in the update storage device.

Furthermore, as the fourth aspect of the present invention based on the above described configuration, a replacing first data processing device can be designed to take over the function of controlling the update storage device when a plurality of first data processing devices are connected to the network and when an active first data processing device fails.

Finally, as the fifth aspect of the present invention, the update storage device can be a ring buffer, and the predetermined shared data writing operation by the version data writing unit to the ring buffer, which is the update storage device, is realized only as an additional write, and a delayed update unit is designed to be activated depending on the amount of predetermined shared data to be written to the ring buffer, that is, the update storage device.

According to the present invention, the updating operation performed on predetermined shared data by the first data processing device and the second data processing device is accepted by the first predetermined shared data access control unit in the first data processing device through all second data processing devices and the network. Then, the updating operation is performed by the predetermined shared data updating unit. The update result is written by the version data writing unit to the update storage device.

During the operation, the referring operation to predetermined shared data by the second data processing device is accepted by the second predetermined shared data access control unit in the data processing device of the second data processing device, and then the operation is performed by the predetermined shared data referring unit in the data processing device of the second data processing device. The referring operation is performed on the shared storage device by the predetermined shared data referring control unit. As a result, the above described shared data of one version prior to the latest version stored in the shared storage device is accessed. Therefore, the predetermined shared data requires no lock.

If a new request is issued to update the predetermined shared data in any of the second data processing devices while the updating operation is performed on the predetermined shared data by the first data processing device, the update request is transferred to the first data processing device. The first data processing device sequentially processes each update request in order of arrival using, for example, a queue, thereby maintaining the atomicity during the updating operation.

After the version data writing unit has written a new version of the predetermined shared data to the update storage device, the update state notification unit reads from the first update state management unit the update state indicating that the location of the predetermined shared data has been changed from the shared storage device to the update storage device, and notifies this state to all the other second data processing devices through the network.

The second update state management unit in the second data processing device is informed through the network that the location of the predetermined shared data has been changed from the shared storage device to the update storage device. Subsequently, the predetermined shared data referring control unit refers to the predetermined shared data of a new version stored in the update storage device according to the above described update state managed by the second update state management unit.

A delayed update unit in the first data processing device transfers the predetermined shared data of a new version stored in the update storage device to the shared storage device at an appropriate time.

If a request to refer to the predetermined shared data is issued in the second data processing device during the above described operation, the predetermined shared data referring control unit refers to the predetermined shared data of a new version stored in the update storage device according to the above described update state managed by the second update state management unit.

Thus, since the second data processing device refers to the predetermined shared data stored, not in the shared storage device but in the update storage device, while the delayed update unit updates data in the shared storage device, the above described shared data requires no lock.

After the delayed update unit has transferred a new version of the predetermined shared data from the update storage device to the shared storage device, the update state notification unit reads from the first update state management unit an update state indicating that the location of the predetermined shared data has been changed from the update storage device to the shared storage device, and notifies this to all the other second data processing devices through the networks.

The second update state management unit in the second data processing device is informed through the network that the location of the predetermined shared data has been changed from the update storage device to the shared storage device. Afterwards, the predetermined shared data referring control unit refers to the predetermined shared data of a new version stored in the update storage device according to the above described update state managed by the second update state management unit.

If a request to refer to the predetermined shared data is issued in the second data processing device when a new updating operation is started on the predetermined shared data in the predetermined shared data updating unit in the first data processing device, in response to a request to update the predetermined shared data received through the network or a request to update the predetermined shared data issued in the second data processing device after the second data processing device has referred to the new version of the predetermined shared data stored in the update storage device, the predetermined shared data referring control unit refers to the predetermined shared data of one version prior to the latest version in the update storage device.

In this case, a new updating operation is performed on the predetermined shared data at the storage position assigned to a new version in the update storage device by the version data writing unit in the first data processing device. During the operation, the predetermined shared data referring control unit in the second data processing device refers to the predetermined shared data of one version prior to the latest version in the update storage device at the corresponding storage position. Therefore, the predetermined shared data requires no lock.

After the version data writing unit has written the predetermined shared data of the latest version to the update storage device, the update state notification unit reads from the first update state management unit the update state indicating that the location of the predetermined shared data has been changed from the storage position of one version prior to the latest version in the update storage device to the storage position of the latest version, and notifies this to all the other second data processing devices through the network.

The second update state management unit in the second data processing device is informed through the network that the location of the predetermined shared data has been changed in the update storage device. Afterwards, the predetermined shared data referring control unit refers to the predetermined shared data of the latest version stored in the update storage device according to the above described update state managed by the second update state management unit.

A delayed update unit in the first data processing device transfers, for example, only the predetermined shared data of the latest version of plural versions of the predetermined shared data stored in the update storage device to the shared storage device at an appropriate time.

As described above, a data accessing operation is performed by the first data processing device exclusively as the update of the predetermined shared data according to the present invention. In referring to the predetermined shared data, the data is accessed in either the shared storage device or the update storage device based on the concept of data version transition, thereby realizing parallel access to the shared data without requiring a lock.

Since the predetermined shared data updating unit in the first data processing device and the predetermined shared data referring unit in the second data processing device can be realized as the functions of conventional file systems, the functions of the present invention can be easily added to conventional network systems.

If the first data processing device is designed as including all functions of the second data processing device, the first data processing device and second data processing device can be connected to the network without the relationship of master and slave.

Furthermore, if a request to update predetermined shared data is issued as a request to update the system data (directory data and i-node of a directory and a file) regulating the structure of the file system other than the file data in the file system stored in the shared storage device, then the user can prevent update requests from concentrating on the first data processing device.

Otherwise, if the request to update predetermined shared data is issued as a request to update either the file data or the system data, which is other than the file data and regulates the structure of the file system, in the file system stored in the shared storage device, then the reliability of the shared data can be improved by the largest possible extent.

According to the second aspect of the present invention, the predetermined shared data in the shared storage device can be easily restored to its normal state using the predetermined shared data stored in the update storage device when a failure occurs in a host device.

According to the third aspect of the present invention, predetermined shared data of plural versions stored in the update storage device can be freely accessed.

According to the fourth aspect of the present invention, the first data processing device for backup successfully takes over the functions of controlling the update storage device when a failure occurs in a host device.

According to the fifth aspect of the present invention, designing the update storage device as a ring buffer simplifies the control of the update storage device by the version data writing unit and delayed update unit.

BRIEF DESCRIPTION OF THE DRAWINGS

FIG. 5 shows an example of the location list;

DESCRIPTION OF THE PREFERRED EMBODIMENTS

The embodiments of the present invention are described in detail by referring to the attached drawings.

Figure 1:
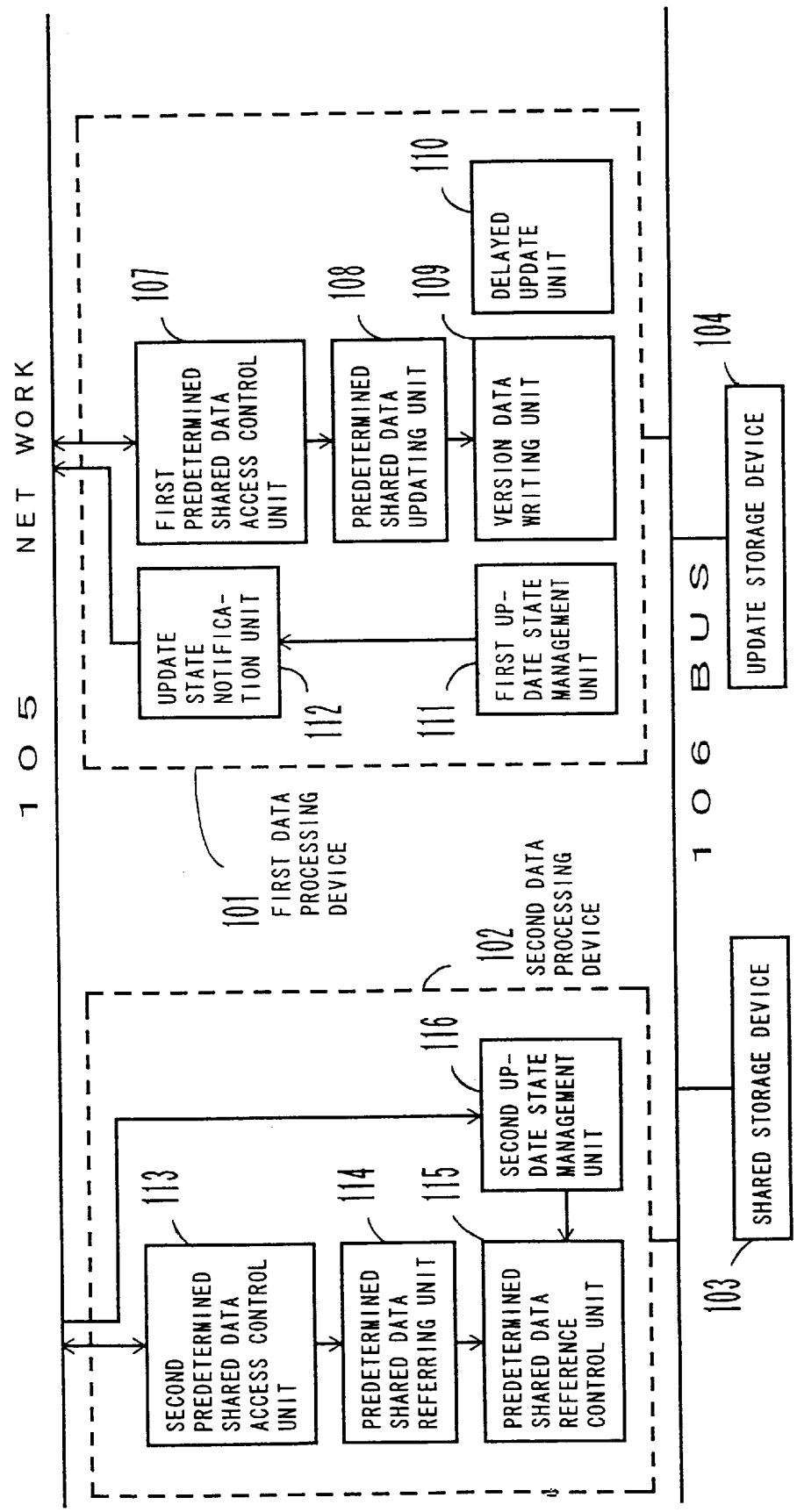
FIG. 1 is a block diagram of the present invention.

FIG. 1 is a block diagram showing the present invention.

According to the present invention, a plurality of data processing devices share a bus 106 (SCSI bus 205 in FIG. 2) through which they access a shared storage device 103 (file system unit 203) and an update storage device 104 (update buffer unit 204), and are connected to one another through a network 105 (network 202) in a shared data processing system.

First, the following units, hereinafter referred to by numbers 107 through 112, are provided in the first data processing device 101 (master host device 201m) consisting of at least one of the plurality of data processing devices.

That is, a first predetermined shared data access control unit 107 (data access control unit 207m) receives requests through a network 105 from data processing devices to a shared storage device 103 to update predetermined shared data, or requests from its own data processing device to update the predetermined shared data.

A predetermined shared data updating unit 108 (file system control unit 206m) updates predetermined shared data in response to a request to update the predetermined shared data received by the first predetermined shared data access control unit 107.

A version data writing unit 109 (a write control unit in an access switching unit 401m in a virtual device 209m) writes a version of the predetermined shared data updated by the predetermined shared data updating unit 108 to the update storage device 104.

A delayed update unit 110 (delayed update unit 403m) writes a predetermined version of predetermined shared data stored in the update storage device 104 at a predetermined time to the shared storage device 103 in a storage position corresponding to the predetermined shared data.

A first update state management unit 111 (location list unit 402m) manages the update state of the predetermined shared data in the update storage device 104.

An update state notification unit 112 (data access control unit 207m) notifies a plurality of data processing devices through the network 105 of the update state of the predetermined shared data stored in the update storage device 104 managed by the first update state management unit 111.

Next, the following units, hereinafter referred to by the numbers 113 through 116, are provided in the second data processing device 102 (slave host device 201s) consisting of at least one of the plurality of data processing devices.

That is, when a request to access the shared storage device 103 is issued from the data processing device in a second predetermined shared data access control unit 113 (data access control unit 207si) to update predetermined shared data, a second predetermined shared data access control unit 113 sends the request to update the predetermined shared data to the first data processing device 101 through the network 105. If the access request is issued to refer to the predetermined shared data, the second predetermined shared data access control unit 113 accepts the request to refer to the predetermined shared data.

A predetermined shared data referring unit 114 (file system control unit 206si) refers to predetermined data in response to the request to refer to the predetermined shared data accepted by the second predetermined shared data access control unit 113.

A second update state management unit 116 (version transition unit 208si and location list unit 402si) manages the update state, received from the first data processing device 101 through the network 105, of the predetermined shared data stored in the update storage device 104.

A predetermined shared data reference control unit 115 (read control unit in the access switching unit 401si in the virtual device 209si) issues from the second data processing device 102 directly through the bus 106 a request to refer to the predetermined shared data, by the predetermined shared data referring unit 114, stored in either the shared storage device 103 or update storage device 104 depending on the update state of the predetermined shared data in the update storage device 104 managed by the second update state management unit 116.

<General Configuration of the Embodiment>

Figure 2:
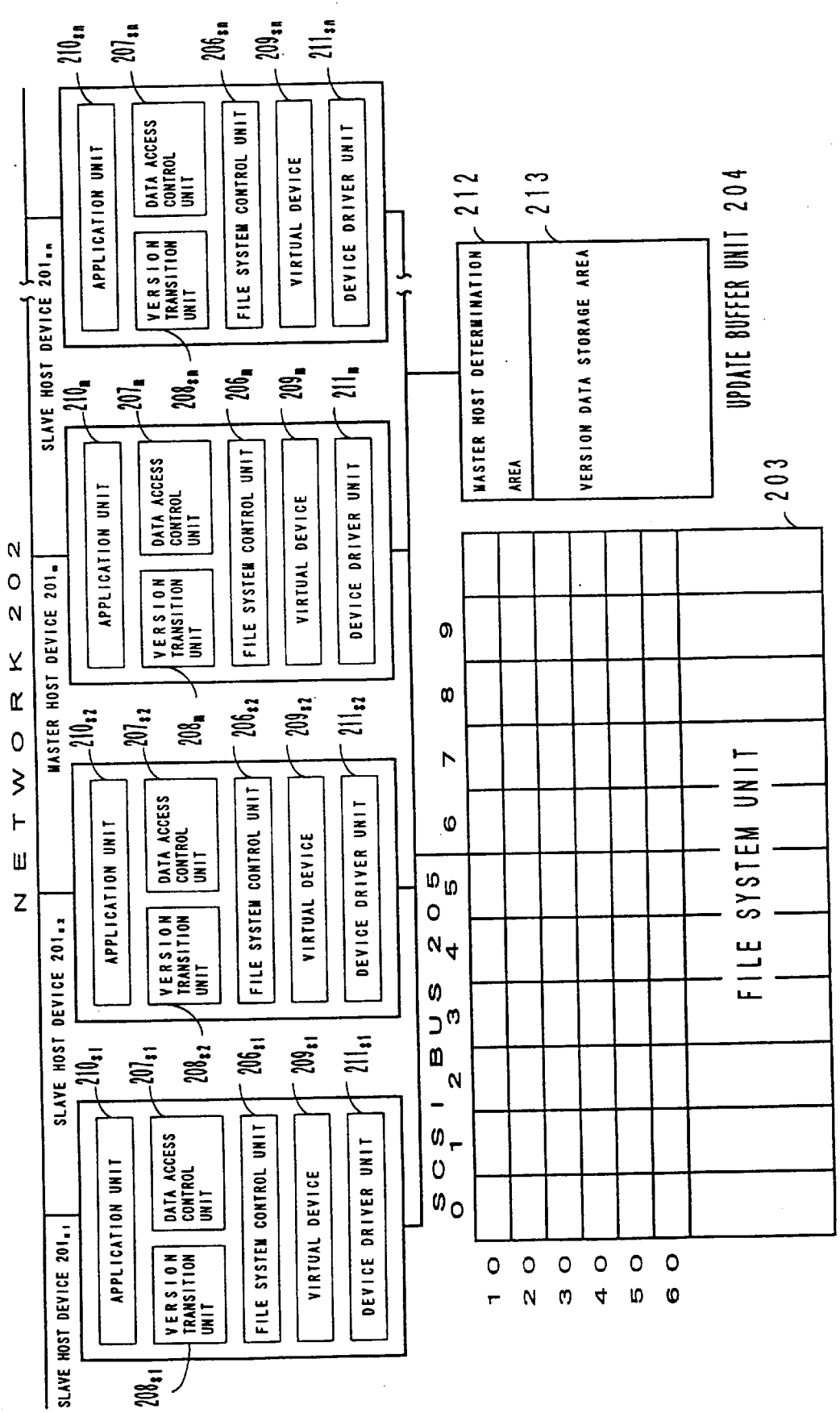
FIG. 2 shows the configuration of the embodiment of the present invention.

FIG. 2 shows the configuration of an embodiment of the present invention.

According to the present embodiment, a plurality of host devices 201 are interconnected through a network 202, such as the Ethernet, etc.

The plurality of host devices 201 share the file system unit 203 and the update buffer unit 204 through the SCSI bus 205. The file system unit 203 consists of management data such as boot blocks, super blocks, etc.; i-node data; and file data containing directory files, normal files, special files, etc. It is stored on a magnetic disk storage device, not shown in the drawings, but which is connected to the SCSI bus 205. The update buffer unit 204 is reserved in a series of areas in the same partition on the above described magnetic disk storage device as the file system unit 203. When the shared data is stored on the magnetic disk storage device, the update buffer unit 204 can be reserved on a non-volatile semiconductor storage device. When the shared data is stored in an MO (Magnet-Optical) disk, the update buffer unit 204 may be reserved on the magnetic disk storage device or on the non-volatile semiconductor storage device.

The plurality of host devices 201 can have the same functions. During the operation, one host device 201 is set as a master host device 201m, and other host devices 201 are set as slave host devices 201sl through 201sn.

In the following explanation, the subscript m indicates that the number to which it is added refers to a block belonging to the master host device 201m. Likewise, the subscripts sl through sn indicate that the numbers to which they are added refer to blocks belonging to the slave host devices 201sl through 201n. The subscript si (i=1 to n) indicates that the number to which it is added refers to a block belonging to a slave host device 201si.

<General Operation of the Embodiment>

The general operation of the present embodiment is described before explaining the practical configuration of each host device 201 of the present embodiment.

step 1

Of the requests to access the predetermined shared data (i node, directory file, file data, etc. hereinafter referred to simply as predetermined data) issued by an application unit 210si in the slave host device 201si, only an update request (write request) is transferred to the master host device 201m through the network 202 according to the present embodiment. In the master host device 201m, an updating operation is performed on the predetermined data in the file system unit 203 in response to an update request received through the network 202 or an update request issued in the master host device 201m. The obtained data are sequentially stored as updated predetermined data, not in the file system unit 203, but in a version data storage area 213 in the update buffer unit 204.

For example, a normal file is deleted by clearing the entry of the normal file from the directory file to which the file belongs and releasing the i-node of the normal file. That is, in deleting the file, the updated predetermined data corresponding to the directory file and the updated predetermined data corresponding to the i-node are written to the update buffer unit 204. Therefore, the file deleting operation can be defined as generating a file, writing to the file, and writing updated predetermined data to the update buffer unit 204.

If a request to refer to predetermined data (read request) is issued in the application unit 210si in any slave host device 201si before a location change notification (described later) is received from the master host device 201m while the predetermined data is updated in the master host device 201m, the slave host device 201si can directly refer to the predetermined data in the file system unit 203, not through the master host device 201m but through the SCSI bus 205. At this point, the slave host device 201si is accessing the predetermined data of an old version stored in the file system unit 203, not the predetermined data of a new version updated by the master host device 201m.

Since the predetermined data is updated in the update buffer unit 204 by the master host device 201m, and the slave host device 201si accesses the predetermined data of one version prior to the latest version in the file system unit 203, the predetermined data requires no lock.

If a new request to update the predetermined data is issued in the slave host device 201si while the predetermined data is being updated in the master host device 201m, then the new update request is transferred to the master host device 201m. The master host device 201m uses a queue to sequentially process update requests in order of arrival, thereby maintaining the atomicity during the updating operation.

If a request (update request or reference request) to access the predetermined data in the file system unit 203 (i node, directory file, data file, etc.) locally managed by each host device 201, is issued in an application unit 210 in the host device 201, the locally managed predetermined data in the file system unit 203 can be directly accessed from the host device 201 through the SCSI bus 205 independently of the request to access shared data, by issuing an access function for the above described access request from a data access control unit 207 in the host device 201 to a file system control unit 206 in the host device 201, according to the shared data mount information, etc.

step 2

After writing the predetermined data of a new version to the update buffer unit 204 in step 1, the master host device 201m sends a location change notification indicating that the location of the predetermined data has been changed from the file system unit 203 to the update buffer unit 204, to all the slave host devices 201sl through 201sn through the network 202.

Upon receipt of the location change notification, the slave host device 201si switches the destination where the predetermined data can be accessed from the file system unit 203 to the update buffer unit 204. Afterwards, the slave host device 201si accesses the predetermined data of a new version updated by the master host device 201m and stored in the update buffer unit 204.

step 3

After sending the location change notification to the network 202 in step 2, the master host device 201m transfers the predetermined data of a new version stored in the update buffer unit 204 to the file system unit 203 at an appropriate time.

If a request to refer to predetermined data is issued in the application unit 210si in any slave host device 201si before a new location change notification is received from the master host device 201m, while the predetermined data of a new version is transferred in the master host device 201m from the update buffer unit 204 to the file system unit 203, the slave host device 201si can directly refer to the predetermined data of a new version in the update buffer unit 204, not through the master host device 201m but through the SCSI bus 205.

The predetermined data requires no lock because the slave host device 201si accesses the updated predetermined data stored in the update buffer unit 204, not in the file system unit 203, while the file system unit 203 is updated by the master host device 201m.

step 4

After transferring the predetermined data of a new version to the file system unit 203 in step 3, the master host device 201m sends a location change notification indicating that the predetermined data has been deleted from the update buffer unit 204 to all the slave host devices 201sl through 201sn through the network 202.

Upon receipt of the location change notification, the slave host device 201si switches the destination where the predetermined data can be accessed from the update buffer unit 204 to the file system unit 203. Afterwards, the slave host device 201si accesses the predetermined data of a new version.

step 5

If a new updating operation (deleting operation) is performed on the predetermined data in the master host device 201m in response to an update request received through the network 202, or issued in the master host device 201m after the slave host device 201si has started accessing the predetermined data of a new version stored in the update buffer unit 204 as a result of the above described step 2, and if a request to refer to the predetermined data is issued in the application unit 210si in the slave host device 201si before a new location change notification is received from the master host device 201m, then the slave host device 201si can directly refer to the predetermined data of one version prior to the latest version stored in the update buffer unit 204 through the SCSI bus 205, not through the master host device 201m.

In this case, a new updating operation performed on the predetermined data by the master host device 201m is actually performed corresponding to the storage position assigned to the new version in the update buffer unit 204. During the operation, the slave host device 201si accesses the storage position corresponding to the predetermined data of one version prior to the latest version. Therefore, the predetermined data requires no lock.

step 6

After writing the predetermined data of the latest version to the update buffer unit 204 in step 5, the master host device 201m sends a location change notification indicating that the location of the predetermined data has been changed from the storage position corresponding to the data of one version prior to the latest version stored in the update buffer unit 204 to the storage position corresponding to the data of the latest version, to all the slave host devices 201sl through 201sn through the network 202.

Upon receipt of the location change notification, the slave host device 201si switches the destination where the predetermined data can be accessed from the storage position corresponding to the data of one version prior to the latest version stored in the update buffer unit 204, to the storage position corresponding to the data of the latest version. Afterwards, the slave host device 201si accesses the predetermined data of the latest version updated by the master host device 201m and stored in the update buffer unit 204.

step 7

After sending the location change notification through the network 202 in step 6, the master host device 201m transfers only the predetermined data of the latest version of plural versions of the predetermined data stored in the update buffer unit 204 to the file system unit 203 at an appropriate time.

As described above in steps 1 through 7, the data accessing operation is performed by the master host device 201m exclusively as the update of data according to the present embodiment. In referring to data, the data can be accessed at either the file system unit 203 or the update buffer unit 204 based on the concept of data version transition, thereby realizing parallel access to the shared data without requiring a lock.

Figure 3:
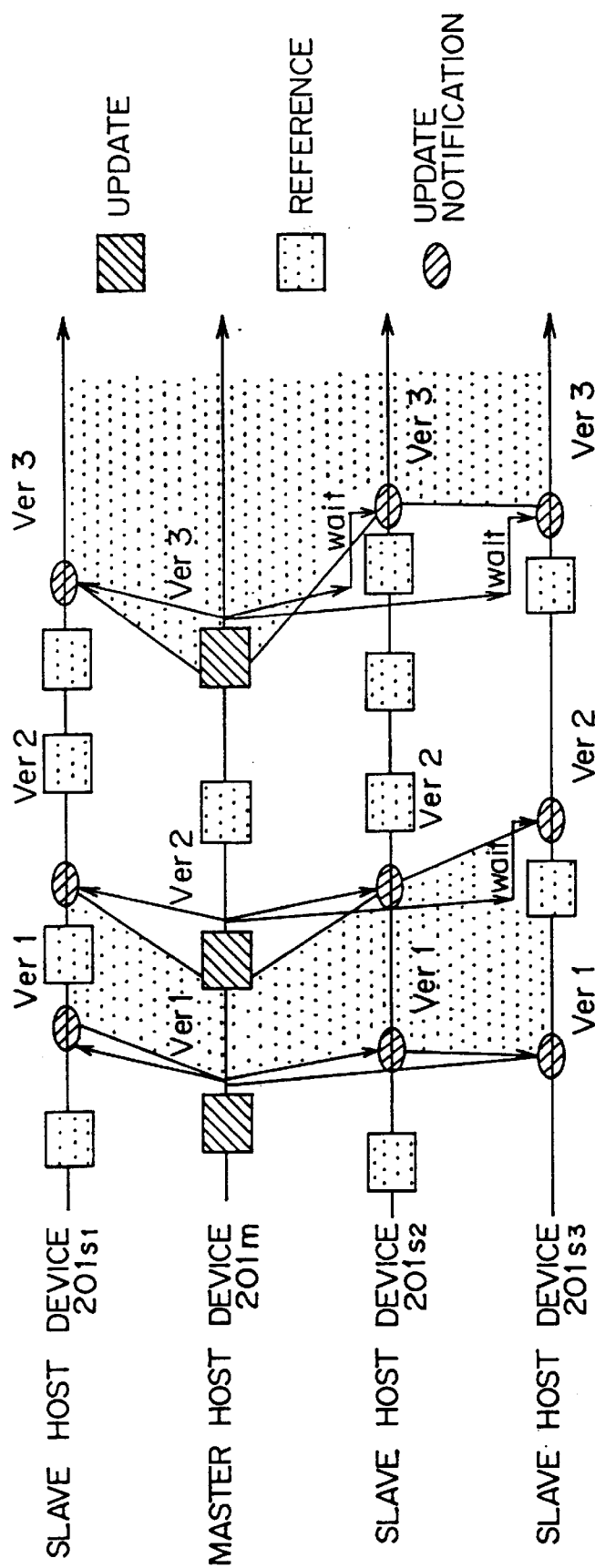
FIG. 3 shows an operation of assuring the consistency of the file system based on the version transition concept.

FIG. 3 shows the operation of assuring the consistency in the file system based on the version transition concept.

Each time the version of the predetermined data is updated in the master host device 201m, the location change notification is provided to other slave host devices 201sl through 201sn. The slave host device 201si refers to the latest version of the predetermined data each time it successfully receives the location change notification.

<Detailed Configuration of the Embodiment>

Described below is the detailed configuration of the host device 201 to realize the above described function according to an embodiment of the present invention.

Each host device 201 is provided with at least a processor and a main storage device, etc. not shown in the drawings. The hardware realizes the functions of the operating system and application programs. As a function block specifically relating to the present invention, the host device 201 includes the application unit 210, file system control unit 206, data access control unit 207, version transition unit 208, virtual device 209, and device driver unit 211.

First, the application unit 210 corresponds to the processes of the application program executed in parallel (in time divisions) according to a user command.

The data access control unit 207 processes a request from the application unit 210 to access predetermined data according to the v-node information consisting of a type of file system to which predetermined data belongs, and a pointer to an access function (open, write, read, close, etc.) corresponding to each access request. A v-node is stored together with an i-node (described later) in the file system unit 203 or update buffer unit 204 (described later). The data access control unit 207 accesses the v-node through the file system control unit 206, virtual device 209, device driver unit 211, and SCSI bus 205.

Described below are the practical functions of the data access control unit 207.

As a first function, the data access control unit 207 classifies the requests from the application unit 210 to access predetermined data into local requests and remote requests.

That is, if a request issued in the application unit 210si in the slave host device 201si to access the predetermined data refers to a request (write request) to update the shared data stored in the file system unit 203, then the data access control unit 207si converts the update request into a remote procedure call to the master host device 201m, and sends it to the master host device 201m through the network 202.

If a request issued in the application unit 210si in the slave host device 201si to access the predetermined data refers to a request (read request) to refer to the shared data stored in the file system unit 203, or refers to a request (update request or a reference request) to access local data in the file system unit 203 or in other file systems, then the data access control unit 207si issues an access function corresponding to the access request to the file system control unit 206si in the slave host device 201si.

The data access control unit 207m in the master host device 201m converts the access request through the remote procedure call received from the slave host device 201si through the network 202, and the access request issued in an application unit 210m in the master host device 201m, into access functions corresponding to the access requests. Then, the data access control unit 207m issues the access functions to the file system control unit 206m in the master host device 201m.

As the second function, when issuing the access functions corresponding to the requests to access the predetermined data, the data access control unit 207 enters each access request in the queue and sequentially performs the transactions corresponding to each access request so that the data access control unit 207 can successfully prevent a plurality of access requests from generating inconsistency among them, especially during an updating operation performed on the predetermined data by the data access control unit 207m in the master host device 201m. Thus, the atomicity can be maintained during the data manipulation.

As the third function, when the data access control unit 207 is the data access control unit 207m in the master host device 201m, it instructs the virtual device 209m to store in the version data storage area 213 in the update buffer unit 204, the transaction data (updated predetermined data) updated by the file system control unit 206m according to a request to update the predetermined data, and stored in the cache memory in the file system control unit 206m, through a device driver unit 211m and the SCSI bus 205.

As the fourth function, when the data access control unit 207 is the data access control unit 207m in the master host device 201m, it notifies all the slave host devices 201sl through 201sn through the network 202, the storage position in the file system unit 203, the storage position in the update buffer unit 204, and the location change notification informing of the location data including the length of data, etc. of the transaction data (updated predetermined data) stored in the update buffer unit 204 based on the above described third function.

Next, the version transition unit 208 correctly functions when it is the version transition unit 208si in the slave host device 201si.

As the first function, the version transition unit 208si updates the location list managed by the location list unit 402si (described later) in the virtual device 209si while performing exclusive control in the system according to the location data contained in the location change notification provided from the master host device 201m through the network 202.

As the second function, the version transition unit 208si enters in the queue the location change notification provided by the master host device 201m through the network 202 and sequentially processes the location change notification in the queue, thereby maintaining the atomicity in the state transition of the location list.

As the third function, the version transition unit 208si issues an instruction to the file system control unit 206si to nullify the predetermined data in the cache memory corresponding to the location change notification.

Then, the file system control unit 206 accesses the predetermined data in the file system unit 203 based on the access function issued by the data access control unit 207.

The data access control unit 207 contains and controls cache memory. The file system control unit 206 corresponds to the conventional file system control function.

The virtual device 209 assigns a low-level operation of accessing the predetermined data in the file system unit 203 by the file system control unit 206, to either the file system unit 203 or the update buffer unit 204. The file system control unit 206 constantly issues an access request to the file system unit 203, but the request is directed by the virtual device 209 to either the file system unit 203 or the update buffer unit 204. This feature is unique to the present invention. That is, the feature of the present embodiment resides in the structure in which the functions of the conventional file system control unit 206 are realized in a protocol format by the data access control unit 207, version transition unit 208, and virtual device 209.

Figure 4:
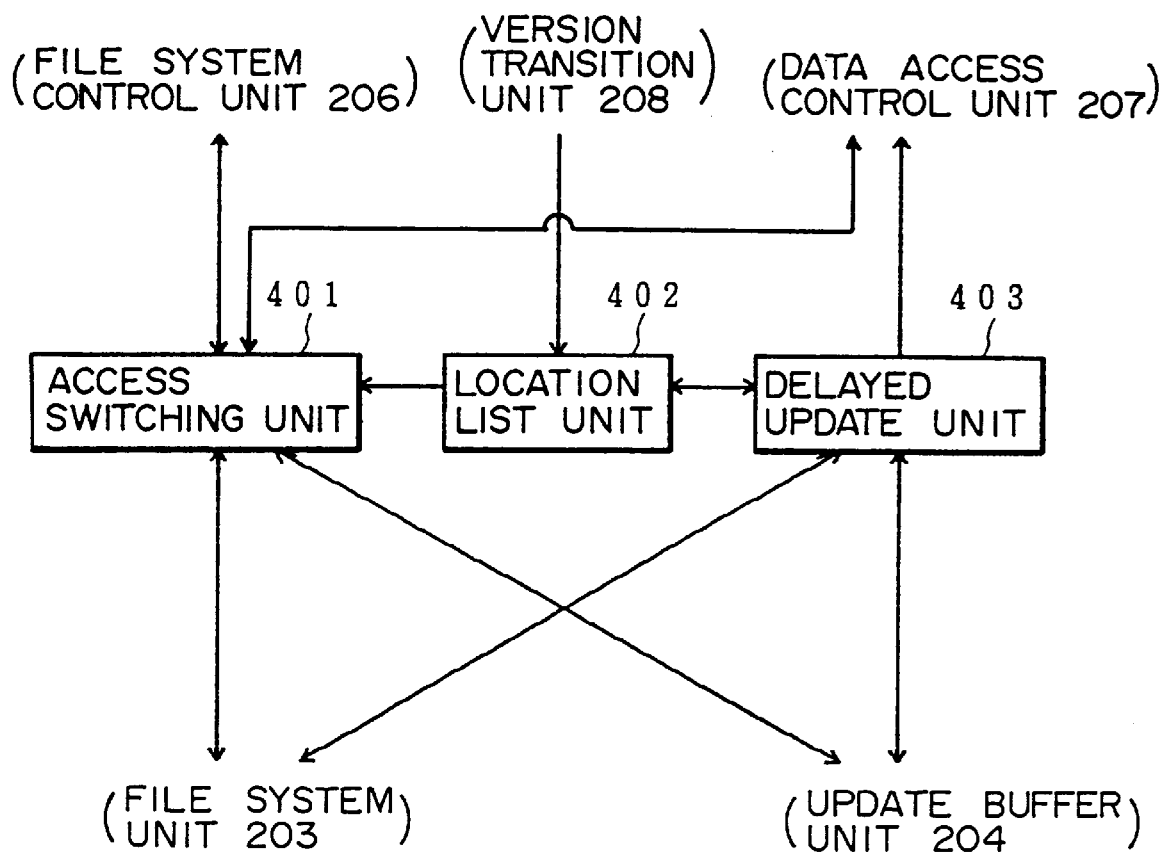
FIG. 4 shows the configuration of a virtual device 209.

FIG. 4 shows the configuration of the virtual device 209.

An access switching unit 401 consists of a read control unit and a write control unit, not shown in the attached drawings.

The read control unit (not shown) in the access switching unit 401 refers to the location list stored in a location list unit 402, and transfers a request from the file system control unit 206 for reading predetermined data stored in the file system unit 203, to either the file system unit 203 or the update buffer unit 204.

A request from the file system control unit 206 to read data is issued with the storage position, in the file system unit 203 designated, of the predetermined data. The reading operation refers to a low-level data manipulation with, for example, a disk number, a track number, and a sector corresponding to a storage position in the file system unit 203 specified.

FIG. 5 shows an example of a location list stored in the location list unit 402 shown in FIG. 4.

Relating to the updated predetermined data stored in the update buffer unit 204, the location list stores the storage position (position in the file system) of the predetermined data in the file system unit 203; the storage position (position in the update buffer) of the predetermined data in the update buffer unit 204; the data length (block length) of the predetermined data; and the update flag indicating the update state of the predetermined data.

The positions in the file system and the update buffer are represented by a disk number, a track number and a sector number.

Update flags include a flag indicating that an updating operation is being performed on the data to be updated; a flag indicating that the updating operation has been completed on the updated predetermined data; a flag indicating that a delayed update unit 403 (described later) is processing the updated predetermined data; and a flag indicating that the delayed update unit 403 has completely processed the updated predetermined data, etc.

The read control unit (not shown) in the access switching unit 401 checks whether or not the storage position in the file system unit 203 specified by the request from the file system control unit 206 to read predetermined data matches the latest value of the item "file system position" of the predetermined data in the location list stored in the location list unit 402. If the check indicates a matching result, the read control unit refers to the values of the item "update buffer position" and the item "data length" of the predetermined data and reads the predetermined data from the update buffer unit 204. If the check indicates a non-matching result, the read control unit reads the predetermined data from the file system unit 203.

When the file system control unit 206 issues a request to write the predetermined data, the write control unit (not shown) in the access switching unit 401 writes to the update buffer unit 204 the updated predetermined data, together with the header and footer portions generated by the write control unit, written to the cache memory in the file system control unit 206 in response to the write request.

Then, the write control unit adds to the location list in the location list unit 402 the location data of the predetermined data of a new version written to the update buffer unit 204, and requests the data access control unit 207*m* to issue a location change notification on the added location data. In response to the request, the data access control unit 207*m* sends to all the other slave host devices 201sl through 201sn through the network 202 the location change notification indicating that the predetermined data of a new version has been added to the update buffer unit 204.

Upon receipt of the location change notification, the version transition unit 208si in the slave host device 201si updates the location list stored in the location list unit 402si in the virtual device 209si according to the notification.

As a result, the destination where the predetermined data is accessed from the slave host device 201si can be changed according to the new location list, and the version of the predetermined data is updated.

Then, the delayed update unit 403 shown in FIG. 4 is realized when the virtual device 209 is a delayed update unit 403*m* contained in the virtual device 209*m* in the master host device 201*m*. While referring to the location list stored in the location list unit 402*m*, the delayed update unit 403*m* transfers the latest version of the predetermined data stored in the update buffer unit 204 to the storage position of the predetermined data in the file system unit 203 at an appropriate time. The "appropriate time" refers to, for example, a point when the storage capacity in the update buffer unit 204 is equal to or smaller than a predetermined value; when the processor in the master host device 201*m* is in an idle state; when the memory usage in the file system control unit 206*m* has reached a predetermined value; and when no access request has been received from the file system control unit 206*m* for a predetermined time, etc.

In the above described transferring operation, the delayed update unit 403*m* improves the transfer efficiency by scheduling, for example, the order of transfer. Practically, the delayed update unit 403*m* shortens the seek time in the magnetic disk storage device which stores the file system unit 203, by sequentially transferring the predetermined data in order from the smallest number of contained blocks. Otherwise, the delayed update unit 403*m* efficiently accesses the magnetic disk storage device by collectively transferring a series of blocks. Furthermore, when a heavy load is imposed on an input/output process, the load can be reduced by setting an earlier transfer timing with a longer transfer interval.

Next, the delayed update unit 403*m* deletes the location data of all versions of the transferred predetermined data from the location list stored in the location list unit 402*m*.

The delayed update unit 403*m* requests the data access control unit 207*m* to issue a location change notification to request the deletion, from the location list, of the location data completely transferred from the update buffer unit 204 to the file system unit 203. In response to the request, the data access control unit 207*m* sends the location change notification to all the slave host devices 201sl through 201sn through the network 202.

Upon receipt of the location change notification, the version transition unit 208si in the slave host device 201si updates the location list stored in the location list unit 402si in the virtual device 209si according to the notification.

As a result, the destination where the predetermined data is accessed from the slave host device 201si is changed from the update buffer unit 204 to the file system unit 203.

Then, the device driver unit 211 controls the signal interface to the SCSI bus 205.

Described below is the configuration of the update buffer unit 204.

As shown in FIG. 2, the update buffer unit 204 consists of a master host determination area 212 and the version data storage area 213.

The master host determination area 212 stores the information for use in determining the master host device 201m from a plurality of host devices 201.

Figure 6:
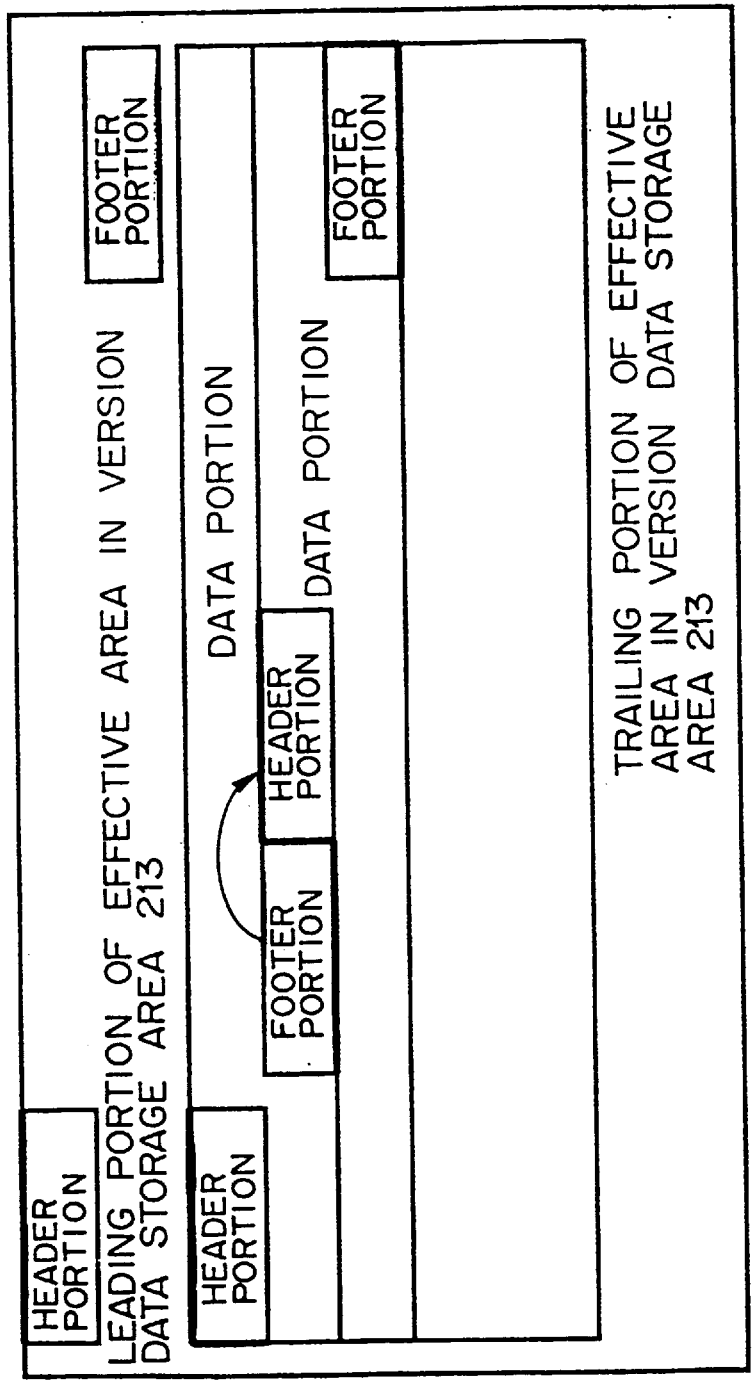
FIG. 6 shows the data configuration of the version data storage area.

The version data storage area 213 stores each version of the predetermined data updated by the master host device 201m. FIG. 6 shows the configuration of the data stored in the version data storage area 213.

The version data storage area 213 is configured as a ring buffer.

Each of the updated predetermined data in the area consists of a header portion, a data portion, and a footer portion, where the header and footer portions are the same in data structure.

The version data storage area 213 is used starting with the leading portion necessarily preceded by the header portion. The leading and trailing portions of the effective area in the version data storage area 213 are managed by the above described delayed update unit 403m in the virtual device 209m in the master host device 201m. Each time the latest version of the predetermined data stored in this area is transferred to the file system unit 203, the position of the leading portion of the effective area is updated. Each time the latest version of the predetermined data is stored in this area, the position of the trailing portion of the effective area is updated.

The header portion stores the size of the updated predetermined data stored in the data portion, a data linkage pointer, and the effective range of the version data storage area 213. The storage position of the footer portion is stored as the size of the data, and a serial number is stored as a data linkage pointer, thereby ensuring the normality of the footer portion and the normality of the header portion to follow the footer portion.

<Detailed Operation of the Embodiment>

Described below is an example of the detailed operation of the embodiments of the present invention.

Updating the file system by the master host device 201m and referring to the file system by the slave host device 201si The detailed operation performed when a request to update predetermined data in the file system unit 203 is issued in the application unit 210m in the master host device 201m, and concurrently when a request to refer to the predetermined data is issued in the application unit 210si in the slave host device 201si, is described below by referring to the explanatory views in FIGS. 7 through 9 and the operating flowchart in FIG. 10.

Figure 7:
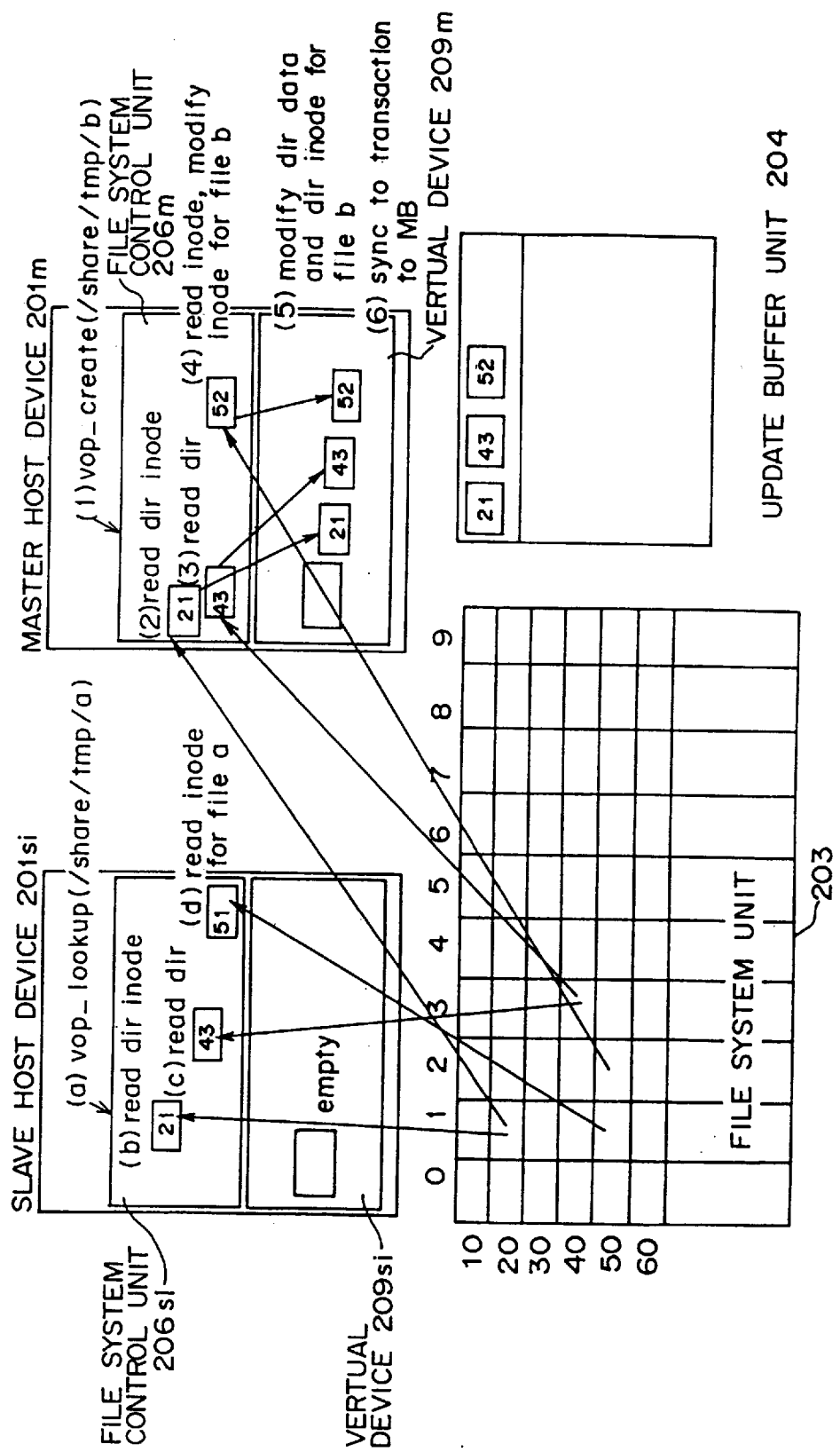
FIG. 7 shows the file system updating operation in the master host device and the file system referring operation in the slave host device (referring to a previous version)

FIG. 7 shows that the file system unit 203 has just been connected to the master host device 201m and the slave host device 201si and that no location list has been generated in the virtual device 209m or virtual device 209si.

Figure 10:
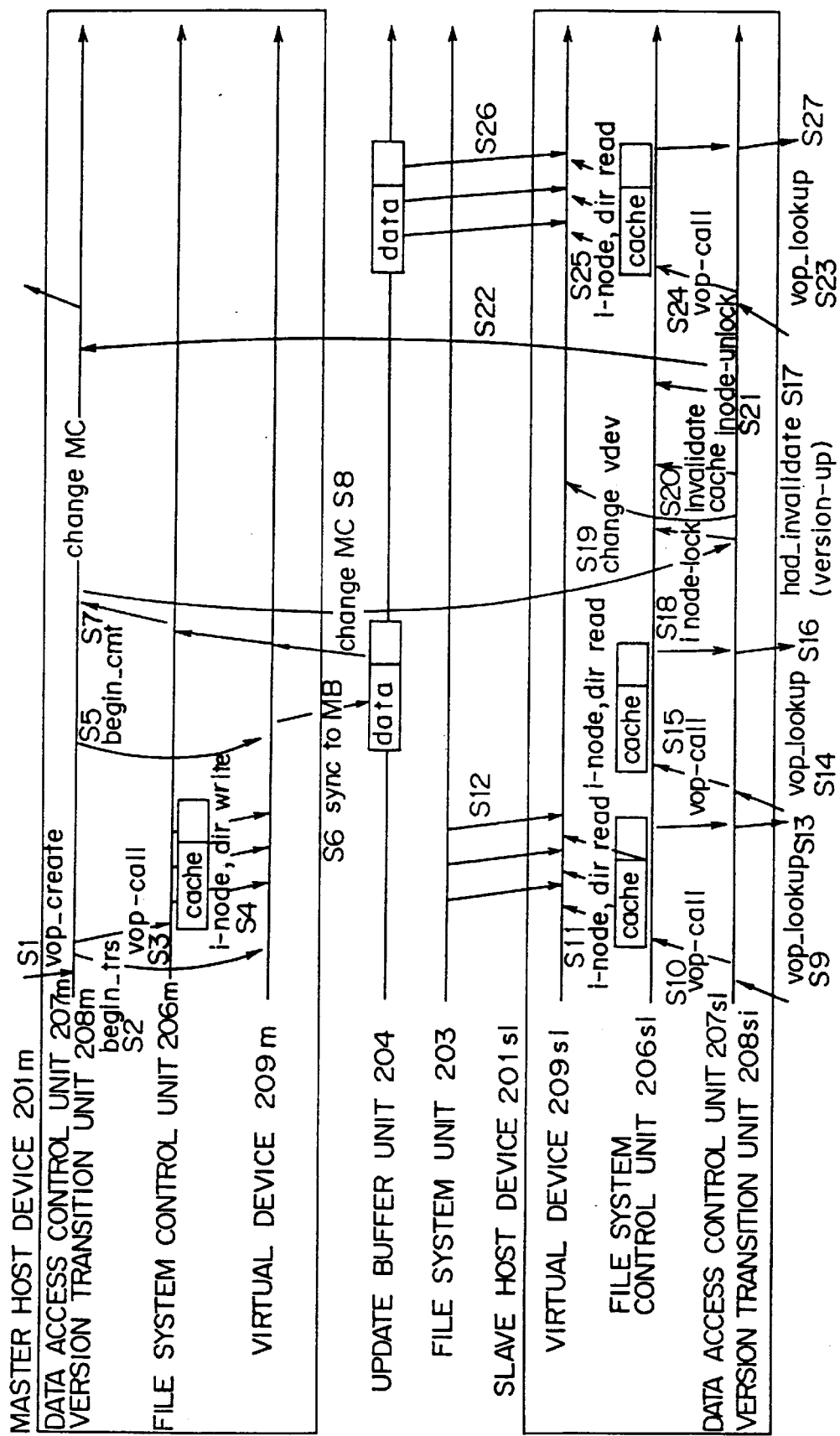
FIG. 10 is an operating flowchart showing the file system updating operation in the master host device and the file system referring operation in the slave host device.

A request to generate file b under the existing directory /share/tmp/ in the file system unit 203 is issued from the application unit 210m in the master host device 201m (vop_create of (1) in FIG. 7 or S1 in FIG. 10). The request is received by the data access control unit 207m in the master host device 201m.

First, the data access control unit 207m instructs the virtual device 209m to start the transaction of creating a file (begin_trs of S2 in FIG. 10).

Then, the data access control unit 207m issues to the file system control unit 206m an access function for creating a file (vop_call of S3 in FIG. 10).

On the other hand, the file system control unit 206m first issues a request to refer to block 21 storing the i-node corresponding to the directory /share/tmp/ (read dir inode of (2) in FIG. 7 and of S4 in FIG. 10).

In the example shown in FIG. 7, no location list has been generated in the location list unit 402m (FIG. 4) in the virtual device 209m in the master host device 201m. Therefore, the read control unit (not shown) in the access switching unit 401m (in FIG. 4) in the virtual device 209m refers to block 21 in the file system unit 203, in response to the request issued in the file system control unit 206m.

As a result, the above described block 21 is read from the file system unit 203, and the data is read through the virtual device 209m.

The i-node stores, in addition to the storage position information (block 43 in this example) such as each directory file or normal file in the file system unit 203, etc., attribute information such as the size, access mode, number of links, owner ID, group ID, date information, etc. of each file.

Then, the file system control unit 206m issues a request (read dir of (3) in FIG. 7 and S4 in FIG. 10) to refer to block 43 storing the directory file corresponding to the directory /share/tmp/ according to the information stored in the i-node retrieved from block 21. In this case, as well as referring to block 21, the virtual device 209m reads the above described block 43 in the file system unit 203, and the data is read through the virtual device 209m.

Furthermore, the file system control unit 206m issues a request (S4 in FIG. 10) to refer to block 52 storing a free i-node. In this case, as well as referring to block 21 or 43, the virtual device 209m reads block 52 in the file system unit 203, and the data is read through the virtual device 209m. The file system control unit 206m stores the information about file b in the i-node in block 52 (read inode, modify inode for file b of (4) in FIG. 7).

The file system control unit 206m adds an entry of the newly created file b to the directory file in block 43, and updates the contents of the i-node in block 21 corresponding to the directory /share/tmp/ (modify dir data and dir inode for file b of (5) in FIG. 7).

The above described update result is provided for the cache memory in the file system control unit 206m and also provided for the virtual device 209m in the master host device 201m (S4 in FIG. 10).

When the above described updating operation is completed in the file system control unit 206m, the data access control unit 207m instructs the virtual device 209m to write the updated predetermined data to the update buffer unit 204 (begin_cmt of S5 in FIG. 10).

Upon receipt of the instruction, the write control unit (not shown) in the access switching unit 401m (in FIG. 4) in the virtual device 209m writes to the update buffer unit 204 the transaction data (updated blocks 21, 43, and 52) stored in the cache memory in the file system control unit 206m, together with the header and footer portions generated by the write control unit (sync to transaction to MB of (6) in FIG. 7, and sync to MB of S6 in FIG. 10).

Then, the write control unit adds to the location list in the location list unit 402m (shown in FIG. 4) the location data (as shown in FIG. 5) on the predetermined data of a new version (updated blocks 21, 43, and 52) written to the update buffer unit 204 as shown in FIG. 7. The write control unit requests the data access control unit 207m to issue the location change notification about the updated predetermined data (S7 in FIG. 10).

Upon receipt of the request from the virtual device 209m to issue the location change notification, the data access control unit 207m sends to all the other slave host devices 201s1 through 201sn through the network 202 the location change notification indicating that the predetermined data of a new version has been added to the update buffer unit 204 (change MC of S8 in FIG. 10).

Assume that a request to refer to an existing file a in the directory /share/tmp/ is issued (vop_lookup of (a) in FIG. 7 or S9 of FIG. 10) in the application unit 210si in the slave host device 201si, and that the data access control unit 207si in the slave host device 201si has received the request before the location change notification sent from the master host device 201m to the network 202 is effectively received by the slave host device 201si, while blocks 21, 43, and 52 are being updated in the master host device 201m.

In the example shown in FIG. 7, blocks 21 and 43 to be processed in the updating operation in the master host device 201m and block 51 not to be processed in the updating operation, correspond to the predetermined data to be referred to according to the above described request.

The data access control unit 207si issues to the file system control unit 206si an access function for referring to a file (vop_call of S10 in FIG. 10).

The file system control unit 206si first issues a request to refer to block 21 storing the i-node corresponding to the directory /share/tmp/ (read dir inode of (b) in FIG. 7, S11 in FIG. 10).

In the example shown in FIG. 7, no location list has been generated in the location list unit 402si (shown in FIG. 4) in the virtual device 209si in the slave host device 201si. Therefore, the read control unit (not shown) in the access switching unit 401si (shown in FIG. 4) in the virtual device 209si refers to the above described block 21 in the file system unit 203, according to the request issued in the file system control unit 206si.

As a result, block 21 in the file system unit 203 is directly read, not through the master host device 201m (S12 in FIG. 10), and the data is read in the cache in the file system control unit 206si through the virtual device 209si.

At this point, the slave host device 201si is accessing block 21 of one version prior to the latest version stored in the file system unit 203, not block 21 of the latest version updated by the master host device 201m.

Then, the file system control unit 206si issues a request to refer to block 43, storing the directory file corresponding to the directory /share/tmp/ according to the information stored in the i-node retrieved from block 21 (read dir of (c) in FIG. 7 and S11 in FIG. 10). As in the case where block 21 is referred to, the virtual device 209si directly reads block 43 in the file system unit 203, not through the master host device 201m (S12 in FIG. 10), and the data is read to the cache memory in the file system control unit 206si through the virtual device 209si.

Furthermore, the file system control unit 206si reads the i-node number corresponding to file a from the entries of the directory files retrieved from block 43. According to the read number, a request to refer to block 51 storing the i-node corresponding to file a is issued (read inode for file a of (d) in FIG. 7, and S11 in FIG. 10). Since block 51 is not processed in an updating operation performed by the master host device 201m, the virtual device 209si directly reads block 51 in the file system unit 203, not through the master host device 201m (S12 in FIG. 10), and the data is read to the cache memory in the file system control unit 206si through the virtual device 209si.

The obtained reference result is returned from the file system control unit 206si to the application unit 210si operated in the slave host device 201si through the data access control unit 207si (S13 in FIG. 10).

Assume that a request to refer to the existing file a in the directory /share/tmp/ is issued in the application unit 210si in the slave host device 201si (vop_lookup of S14 in FIG. 10) and the request is received by the data access control unit 207si before a location change notification is sent from the master host device 201m through the network 202 and effectively received by the slave host device 201si after the above described referring operation. In this case, each data in blocks 21, 43, and 51 corresponding to the reference request has already been stored in the cache memory in the file system control unit 206si. Therefore, when the data access control unit 207si issues an access function for referring to a file to the file system control unit 206si (vop_call of S15 in FIG. 10), the file system control unit 206si returns the information about each block in the cache memory to the application unit 210si operated in the slave host device 201si through the data access control unit 207si (S16 in FIG. 10).

The master host device 201m accesses each of the above listed blocks stored in the update buffer unit 204. None of the blocks requires a lock because the slave host device 201si accesses each block of one version prior to the latest version in the cache memory of the file system unit 203 or file system control unit 206si.

Described below is the operation performed after the version transition unit 208si in the slave host device 201si has received the location change notification sent from the data access control unit 207m in the master host device 201m based on the above described updating operation. FIG. 8 shows the states following the state shown in FIG. 7.

Figure 8:
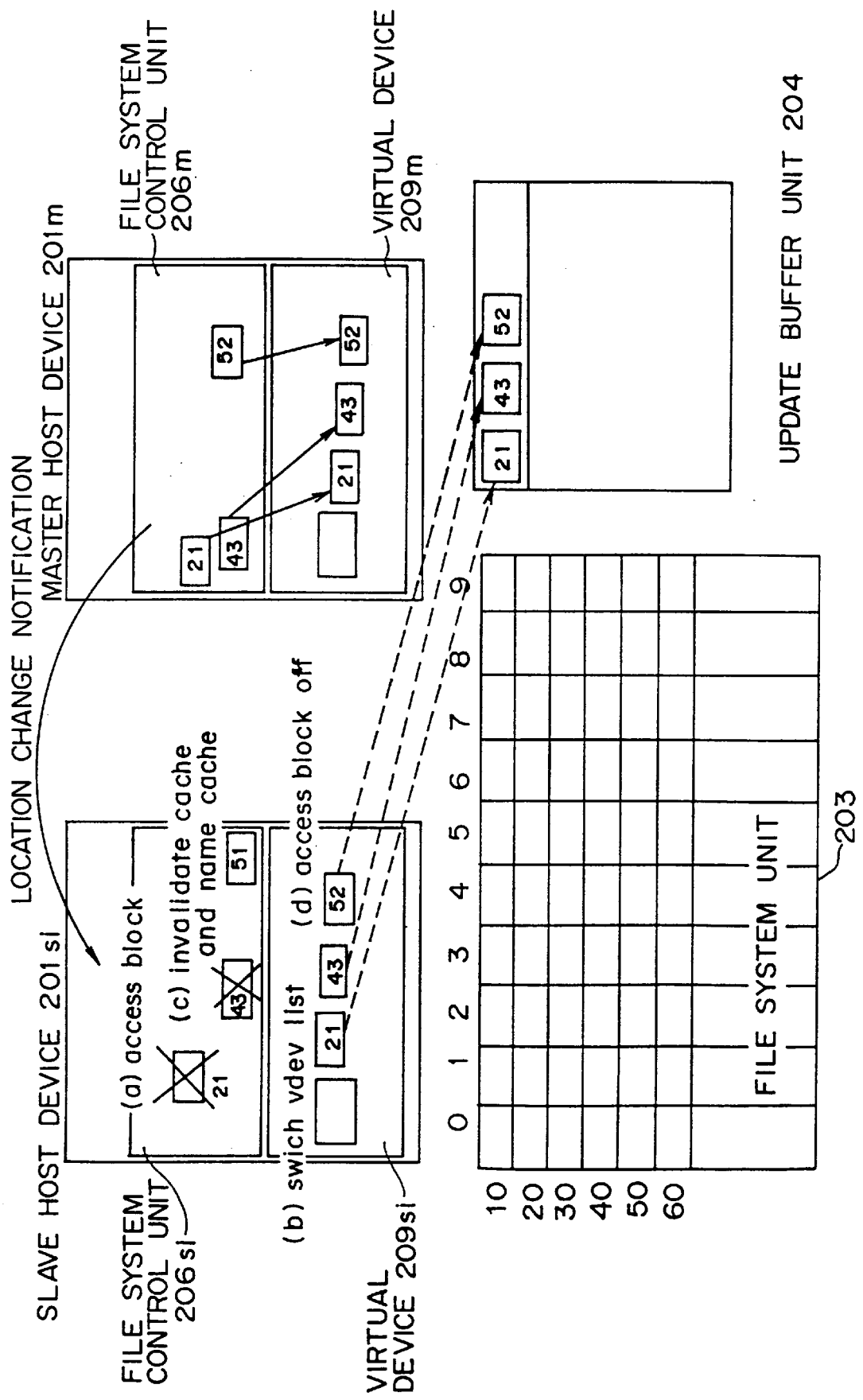
FIG. 8 shows the file system updating operation in the master host device and the file system referring operation in the slave host device (switching versions)

Upon receipt of the above described location change notification (had_invalidate(version-up) of S17 in FIG. 10), the version transition unit 208si inhibits the file reference request from the application unit 210si in the slave host device 201si (access block of (a) in FIG. 8 and inode-lock of S18 in FIG. 10).

According to the location change notification, the version transition unit 208si creates in the location list unit 402m (FIG. 4) in the virtual device 209si a location list which contains the location data (FIG. 5) on the latest versions of blocks 21, 43, and 52 written to the update buffer unit 204 (switch vdev list of (b) in FIG. 8 and change vdev of S19 in FIG. 10).

Then, the version transition unit 208si issues to the file system control unit 206si an instruction to invalidate blocks 21 and 43 in the cache memory corresponding to the location change notification (invalidate cache and name cache of (c) in FIG. 8 and invalidate cache of S20 in FIG. 10). Since block 51 in the cache memory is not processed in the updating operation performed by the master host device 201m (FIG. 7), this block is not invalidated.

Finally, the version transition unit 208si releases the inhibition against the request from the application unit 210si in the slave host device 201si to refer to a file (access block off of (d) in FIG. 8 and inode-unlock of S21 in FIG. 10). Then, the version transition unit 208si notifies the data access control unit 207m in the master host device 201m through the network 202 of the completion of the version update process for the location list (S22 in FIG. 10).

Figure 9:
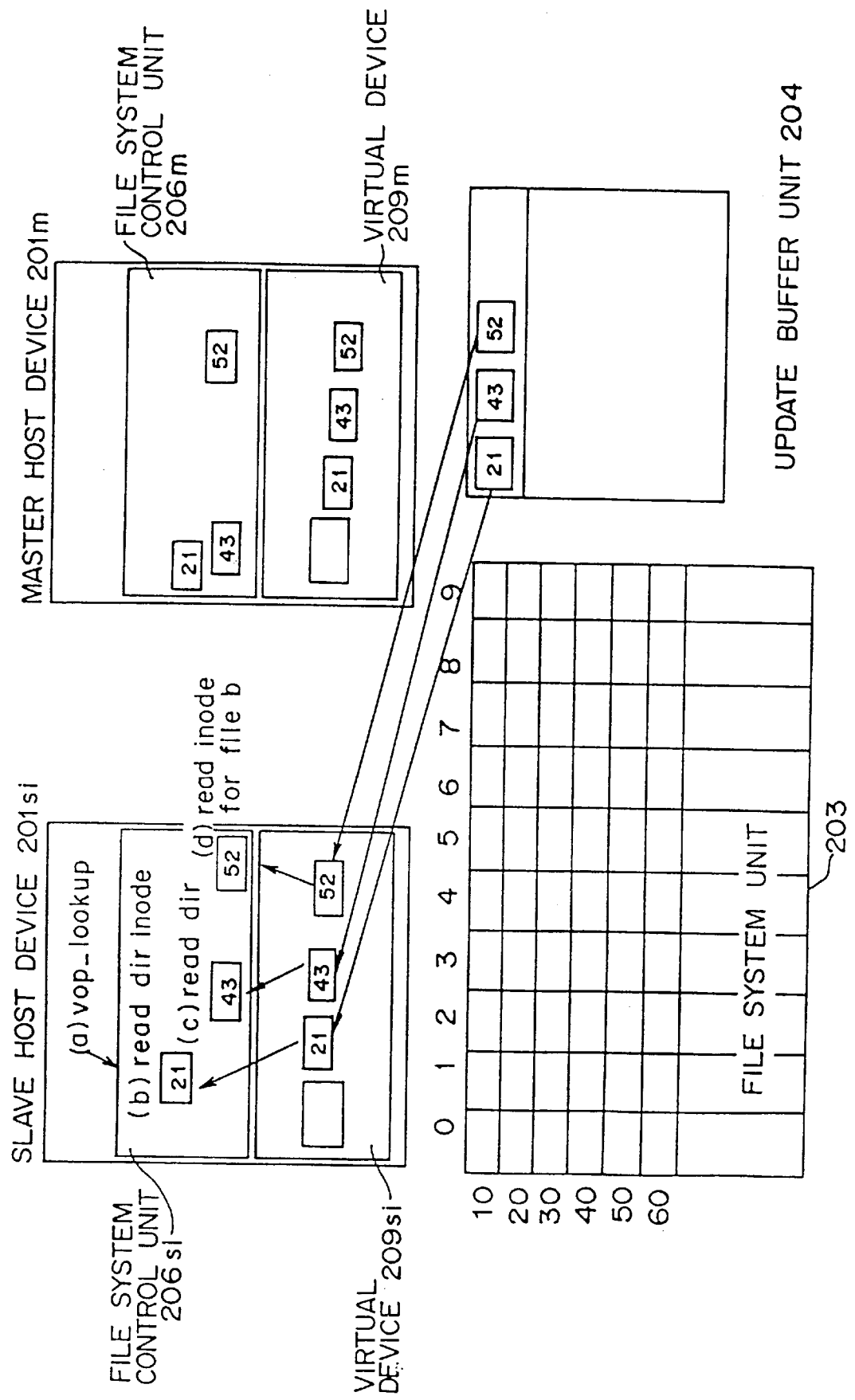
FIG. 9 shows the file system updating operation in the master host device and the file system referring operation in the slave host device (referring to a new version)

Assume that a request to refer to file b located in the directory /share/tmp/ and newly created in the master host device 201*m* is issued in the application unit 210si in the slave host device 201si (vop_lookup of (a) in FIG. 9 or of S23 in FIG. 10) and that the request is received by the data access control unit 207si in the slave host device 201si, after the slave host device 201si has created in the location list unit 402si in the virtual device 209si according to the location change notification from the master host device 201*m*, a location list which contains the location data on the latest versions of blocks 21, 43, and 52 written to the update buffer unit 204.

The data access control unit 207si issues an access function for referring to a file to the file system control unit 206si (vop_call of S24 in FIG. 10).

The file system control unit 206si first refers to block 21 storing the i-node corresponding to the directory/share/tmp/ (read dir inode of (b) in FIG. 9 and of S25 in FIG. 10).

In this case, the file system control unit 206si first inhibits the location list stored in the location list unit 402 from being altered by the version transition unit 208si, and then tries to refer to block 21 in the cache memory. However, since block 21 in the cache memory is invalidated by the version transition unit 208si (invalidate cache and name cache of (c) in FIG. 8 and invalidate cache of S20 in FIG. 10), the file system control unit 206si locks block 21 and then issues a request to refer to block 21 to the virtual device 209si.

In the example shown in FIG. 9, the location data (FIG. 5) of the latest versions of blocks 21, 43, and 52 written to the update buffer unit 204 by the master host device 201*m* is set in the location list unit 402si (FIG. 4) in the virtual device 209si in the slave host device 201si. Therefore, the read control unit (not shown) in the access switching unit 401*s* (FIG. 4) in the virtual device 209si refers to block 21 in the update buffer unit 204 according to the reference request issued by the file system control unit 206si.

As a result, block 21 of a new version is read from the update buffer unit 204 (S26 in FIG. 10), and the data is read to the cache memory in the file system control unit 206si through the virtual device 209si. The file system control unit 206si releases the lock on block 21, and then releases the inhibition on the version transition unit 208si about the alteration of the location list.

Then, according to the information contained in the i-node retrieved from block 21 of a new version, the file system control unit 206si issues a request to refer to block 43 storing the directory file corresponding to the directory /share/tmp/ (read dir of (c) in FIG. 9 and S25 in FIG. 10). As in referring to block 21, block 43 of a new version in the update buffer unit 204 is read through the virtual device 209si (S26 in FIG. 10), and the data is read to the cache memory in the file system control unit 206si through the virtual device 209si.

Furthermore, the file system control unit 206si reads the i-node number corresponding to file b from the entries of the directory files retrieved from block 43. According to the read number, a request to refer to block 52 storing the i-node corresponding to file b is issued (read inode for file b of (d) in FIG. 9, and S25 in FIG. 10). As in referring to block 21 or 43, the virtual device 209si reads block 52 of a new version in the update buffer unit 204 (S26 in FIG. 10), and the data is read to the cache memory in the file system control unit 206si through the virtual device 209si.

The obtained reference result is returned from the file system control unit 206si to the application unit 210si operated in the slave host device 201si through the data access control unit 207si (S27 in FIG. 10).

Updating the file system in the slave host device 201si

Figure 13:
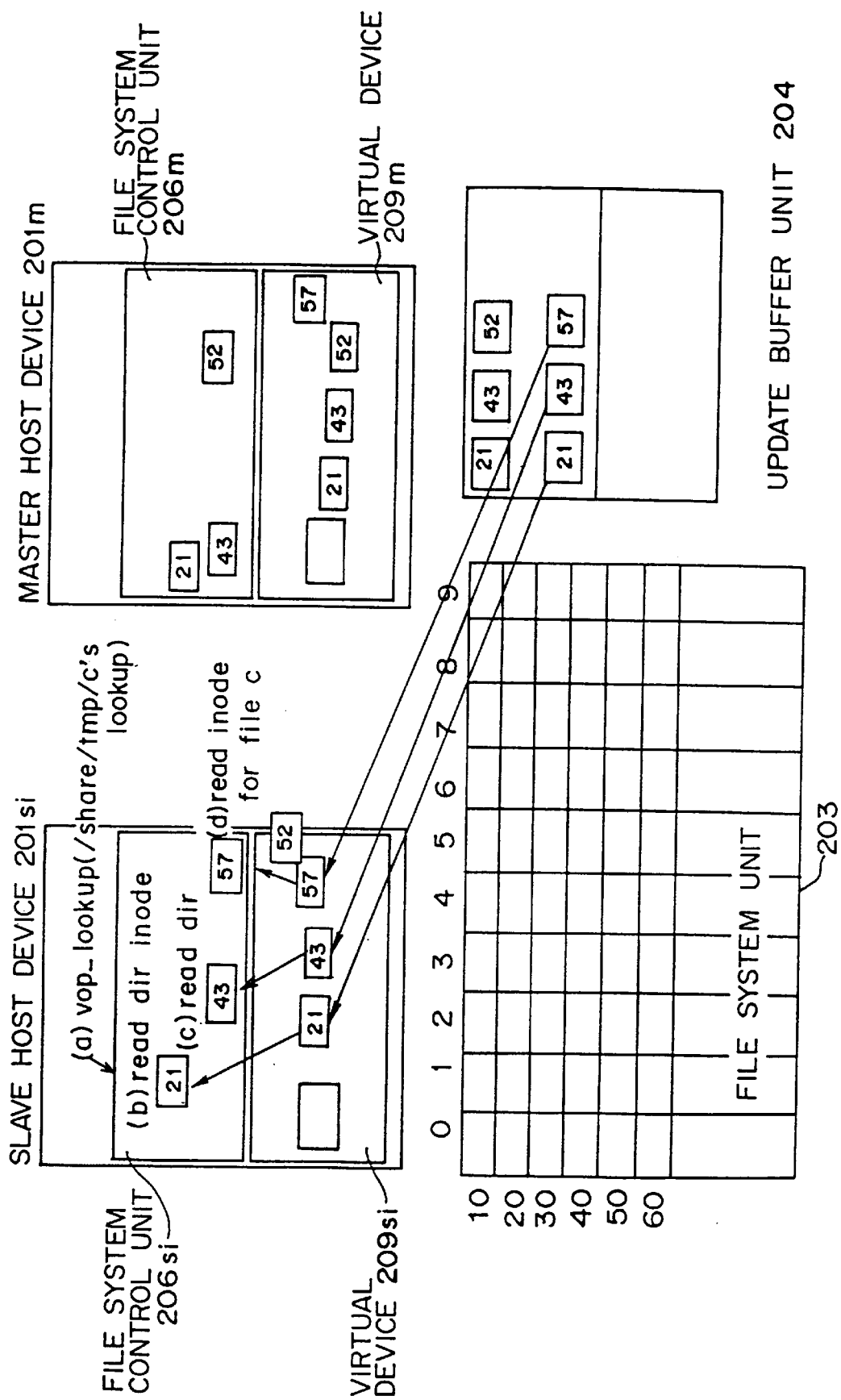
FIG. 13 shows the operation of referring to the file system in the slave host device after the operation shown in FIG. 12.
Figure 14:
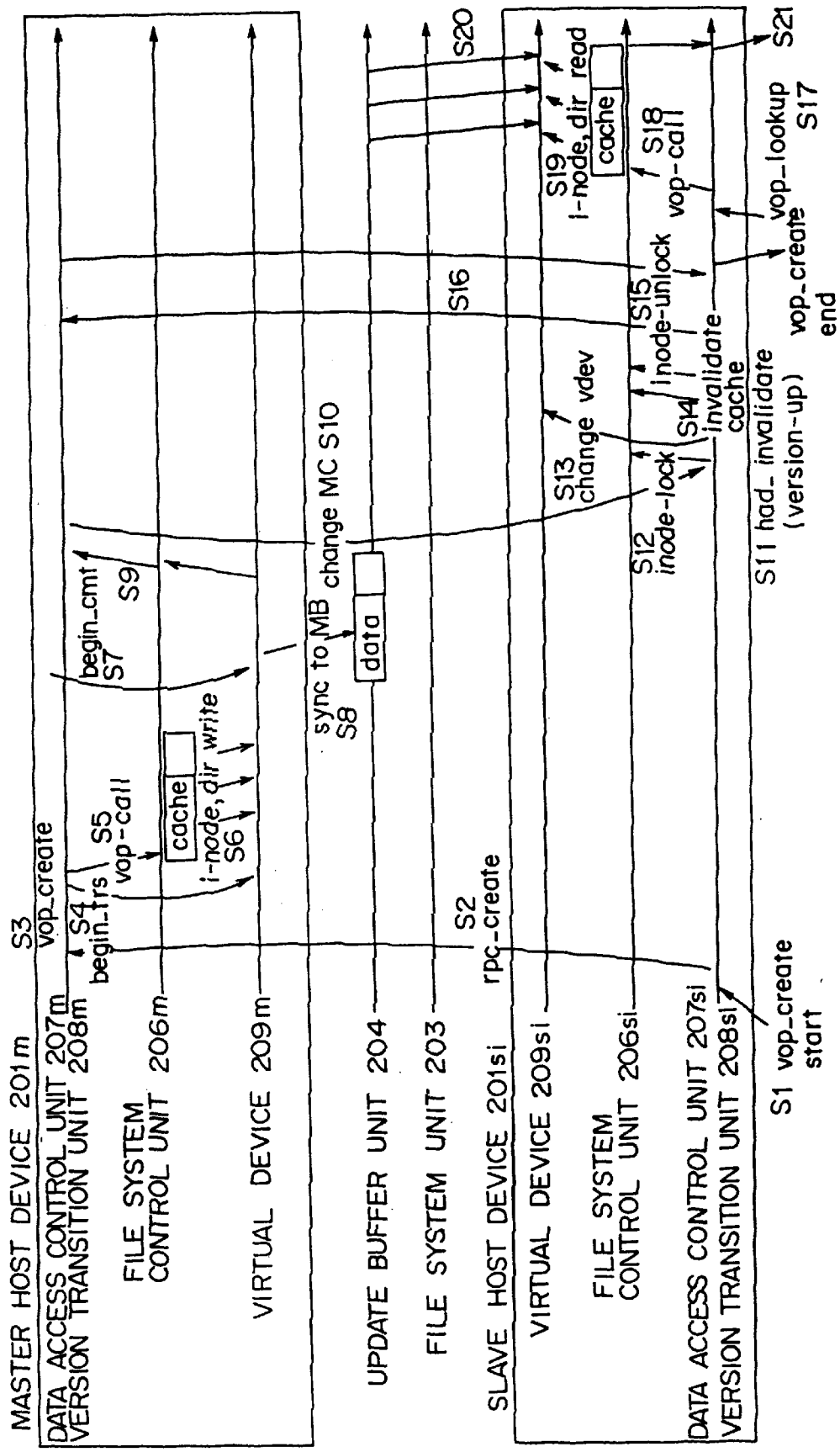
FIG. 14 is an operating flowchart showing the operation of updating and referring to the file system in the slave host device.

Described below by referring to the explanatory views in FIGS. 11 through 13 and the operating flowchart in FIG. 14 is the detailed operation performed when a request to update the predetermined data in the file system unit 203 in the application unit 210si in the slave host device 201si is issued after the state shown in FIG. 9.

Figure 11:
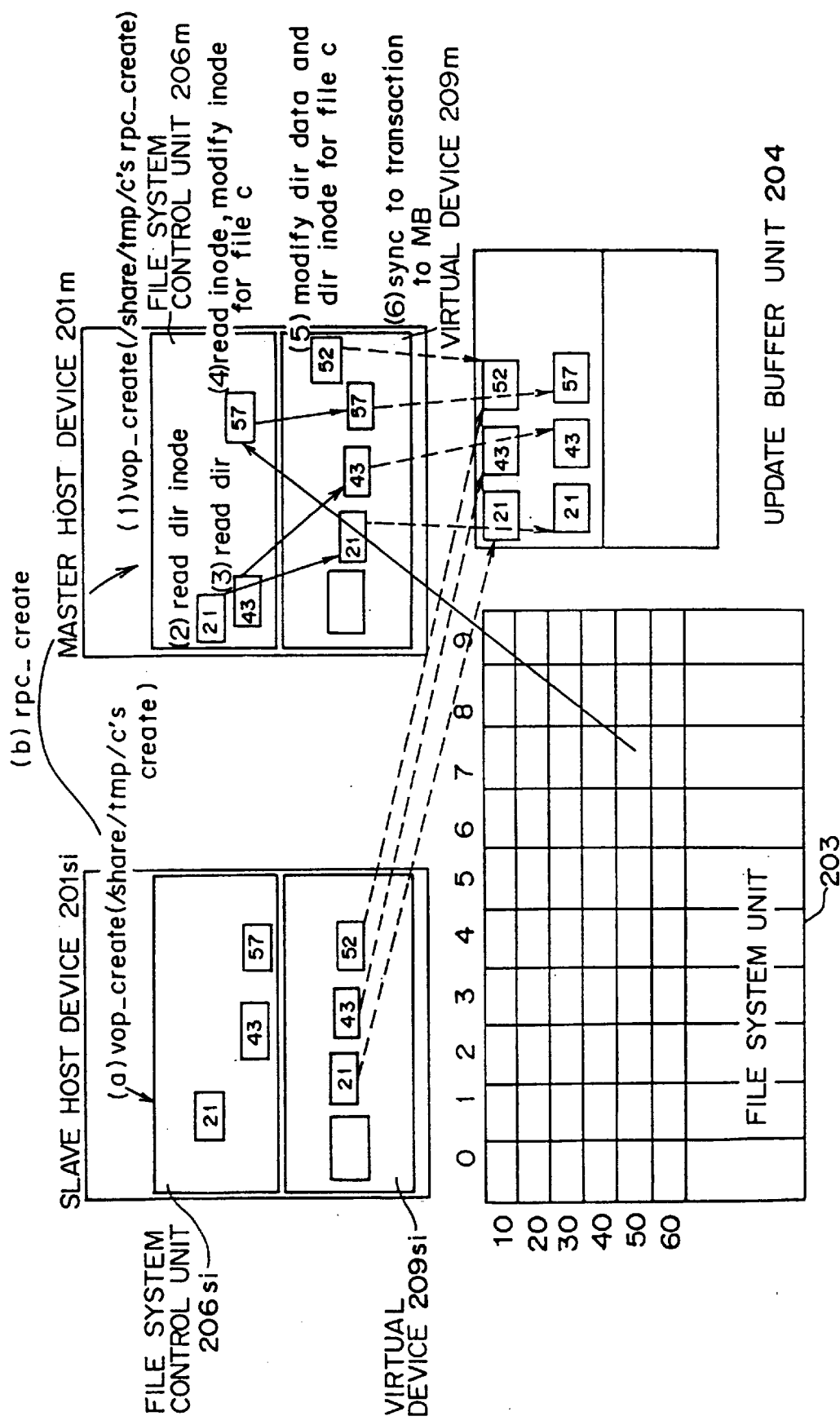
FIG. 11 shows the operation (1) of updating the file system in the slave host device.

FIG. 11 shows the state following the state shown in FIG. 9.

A request to generate file c under the existing directory/share/tms/ in the file system unit 203 is issued by the application unit 210si in the slave host device 201si (vop_create of (a) in FIG. 11 and S1 in FIG. 14). The request is received by the data access control unit 207si in the slave host device 201si.

When identifying the above described file generate request as a request for shared data according to the path name/share/tms/, the data access control unit 207si converts the file generate request into a remote procedure call to the master host device 201*m* (rpc_create of (b) in FIG. 11 or S2 in FIG. 14), and sends it to the master host device 201*m* through the network 202.

According to the above described remote procedure call received through the network 202, a request to generate the file /share/tmp/c is issued in the data access control unit 207*m* in the master host device 201*m* (vop_create of (1) in FIG. 11 or S3 in FIG. 14).

Afterwards, the controlling operation is performed similarly as in the case where a request to update the predetermined data in the file system unit 203 is issued in the application unit 210*m* in the master host device 201*m*.

That is, the data access control unit 207*m* first instructs the virtual device 209*m* to start generating a file (begin_trs of S4 in FIG. 14).

The data access control unit 207*m* issues an access function for generating a file (vop_call of S5 in FIG. 14) to the file system control unit 206*m*.

The file system control unit 206*m* first issues a request to refer to block 21 storing the i-node corresponding to the directory /share/tmp/ (read dir inode of (2) in FIG. 11 and S6 in FIG. 14).

In the example shown in FIG. 11, the location data is set in the location list in the location list unit 402*m* (FIG. 4) in the virtual device 209*m* in the master host device 201*m*, and indicates that the latest blocks 21, 43, and 52 are stored in the update buffer unit 204. The latest blocks 21, 43, and 52 are stored in the cache memory in the file system control unit 206*m*.

Therefore, the file system control unit 206*m* reads from the cache memory the same data in block 21 of the latest version in the update buffer unit 204.

Then, the file system control unit 206*m* issues a request to refer to block 43 storing the directory file corresponding to the directory /share/tmp/ according to the information stored in the i-node retrieved from block 21 (read dir of (3) in FIG. 11 and S6 in FIG. 14). As in referring to block 21, the same data in block 43 of the latest version is read from the cache memory.

Furthermore, the file system control unit 206*m* issues a request to refer to block 57 storing an idle i-node (S6 in FIG. 14). In this case, block 57 is not stored in the cache memory. Therefore, the file system control unit 206*m* issues the request to refer to block 57 to the virtual device 209*m*.

Block 57 is not stored in the update buffer unit 204, and the location data indicating that block 57 is stored in the update buffer unit 204 is not set in the location list in the location list unit 402*m* in the virtual device 209*m*. Therefore, the read control unit (not shown) in the access switching unit 401m in the virtual device 209m issues a request to refer to block 57 to the file system unit 203.

As a result, block 57 in the file system unit 203 is read to the file system control unit 206m through the virtual device 209m. The file system control unit 206m stores the information about file c in the i-node in block 57 (read inode, modify inode for file c of (4) shown in FIG. 11).

The file system control unit 206m adds an entry of a newly generated file c to the directory file in block 43, and updates the contents of the i-node in block 21 corresponding to the directory /share/tmp/ (modify dir data and dir inode for file c of (5) in FIG. 11).

The above described update result is reflected in the cache memory in the file system control unit 206m, and provided for the virtual device 209m in the master host device 201m (S6 in FIG. 14).

When the updating operation is completed in the file system control unit 206m, the data access control unit 207m instructs the virtual device 209m to write the updated predetermined data to the update buffer unit 204 (begin_cmt of S7 in FIG. 14).

Upon receipt of the instruction, the write control unit (not shown) in the access switching unit 401m (FIG. 4) in the virtual device 209m writes to the update buffer unit 204 the transaction data (updated blocks 21, 43, and 57) stored in the cache memory of the file system control unit 206m together with the header and footer portions generated by the write control unit itself (sync to transaction to MB of (6) in FIG. 11 and sync to MB of S8 in FIG. 14).

As a result, the update buffer unit 204 stores, in addition to the latest block 52, blocks 21 and 43 of one version prior to the latest version, and blocks 21, 43, and 57 of the latest version.

Then, as shown in FIG. 11, the write control unit adds to the location list in the location list unit 402m (FIG. 4) the location data about the predetermined data of the latest versions (updated blocks 21, 43, and 57) written to the update buffer unit 204. Then, the write control unit requests the data access control unit 207m to issue the location change notification relating to the location-changed predetermined data (S9 in FIG. 14).

The data access control unit 207m receives the request to issue the location change notification from the virtual device 209m and sends the location change notification indicating that the predetermined data of the latest version has been added to the update buffer unit 204 to all the slave host devices 201sl through 201sn through the network 202 (change MC of S10 in FIG. 14).

The data access control unit 207m can return the location change notification to the slave host device 201si as a reply to the remote procedure call (rpc_create of (b) in FIG. 11 or S2 in FIG. 14) from the data access control unit 207si in the slave host device 201si.

Figure 12:
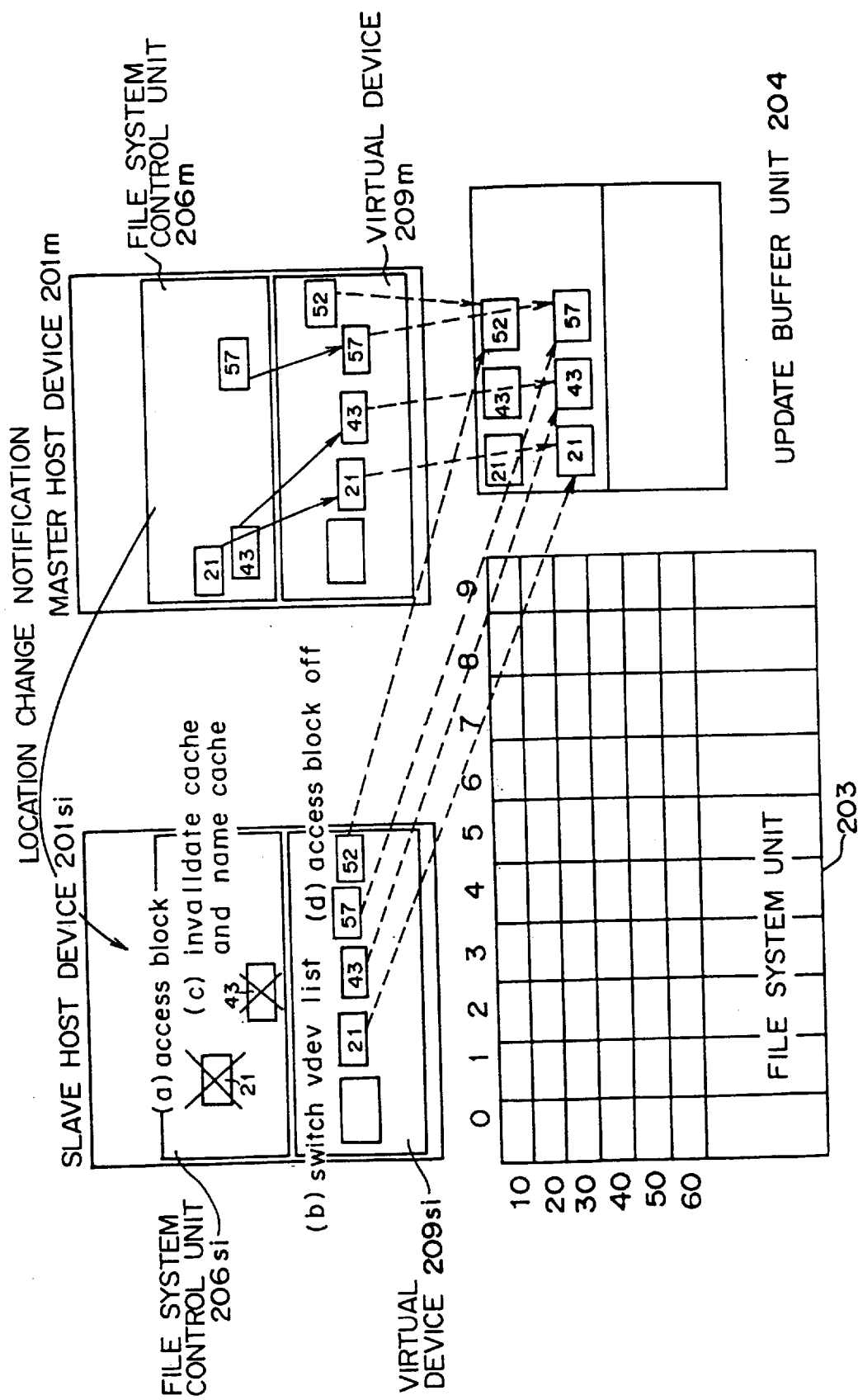
FIG. 12 shows the operation (2) of updating the file system in the slave host device.

FIG. 12 shows the states following the state shown in FIG. 11.

Upon receipt of the above described location change notification (had_invalidate(version-up) of S11 in FIG. 14), the version transition unit 208si in the slave host device 201si inhibits the file reference request from the application unit 210si in the slave host device 201si (access block of (a) in FIG. 12 and inode-lock of S12 in FIG. 14).

According to the location change notification, the version transition unit 208si adds to the location list in the location list unit 402m in the virtual device 209si the location data relating to the latest versions of blocks 21, 43, and 57 written to the update buffer unit 204 (switch vdev list of (b) in FIG. 12 and change vdev of S13 in FIG. 14).

Then, the version transition unit 208si issues to the file system control unit 206si an instruction to invalidate blocks 21 and 43 in the cache memory corresponding to the location change notification (invalidate cache and name cache of (c) in FIG. 12 and invalidate cache of S14 in FIG. 14).

Finally, the version transition unit 208si releases the inhibition against the request from the application unit 210si in the slave host device 201si to refer to a file (access block off of (d) in FIG. 12 and inode-unlock of S15 in FIG. 14). Then, the version transition unit 208si notifies the data access control unit 207m in the master host device 201m of the completion of the version update process for the location list (S16 in FIG. 14).

Assume that a request to refer to file c located in the directory /share/tmp/ and newly created in the master host device 201m is issued in the application unit 210si in the slave host device 201si (vop_lookup of (a) in FIG. 13 or of S17 in FIG. 14), and that the request is received by the data access control unit 207si in the slave host device 201si after the slave host device 201si has added, in the location list in the location list unit 402si in the virtual device 209si according to the location change notification from the master host device 201m, the location data on the latest versions of blocks 21, 43, and 57, newly written to the update buffer unit 204 to the location data on block 52 already written to the update buffer unit 204. FIG. 13 shows the states following the state shown in FIG. 12.

The data access control unit 207si issues an access function for referring to a file to the file system control unit 206si (vop_call of S18 in FIG. 14).

The file system control unit 206si first refers to block 21 storing the i-node corresponding to the directory/share/tmp/ (read dir inode of (b) in FIG. 13 and of S19 in FIG. 14).

In this case, the file system control unit 206si first inhibits the location list stored in the location list unit 402 from being altered by the version transition unit 208si, and then tries to refer to block 21 in the cache memory. However, since block 21 in the cache memory is invalidated by the version transition unit 208si (invalidate cache and name cache of (c) in FIG. 12 and invalidate cache of S14 in FIG. 14), the file system control unit 206si locks block 21 and then issues a request to refer to block 21 to the virtual device 209si.

In the example shown in FIG. 13, the location data of the latest versions of blocks 21, 43, 52, and 57 written to the update buffer unit 204 by the master host device 201m is set in the location list unit 402si (FIG. 4) in the virtual device 209si in the slave host device 201si. Therefore, the read control unit (not shown) in the access switching unit 401s (FIG. 4) in the virtual device 209si refers to block 21 in the update buffer unit 204 according to the reference request issued by the file system control unit 206si.

As a result, block 21 of a new version is read from the update buffer unit 204 (S20 in FIG. 14), and the data is read to the cache memory in the file system control unit 206si through the virtual device 209si. The file system control unit 206si releases the lock on block 21, and then releases the inhibition on the version transition unit 208si about the alteration of the location list.

Then, according to the information stored in the i-node retrieved from block 21 of a new version, the file system control unit 206si issues a request to refer to block 43 storing the directory file corresponding to the directory /share/tmp/ (read dir of (c) in FIG. 13 and S19 in FIG. 14). As in referring to block 21, block 43 of a new version in the update buffer unit 204 is read through the virtual device 209si (S20 in FIG. 14), and the data is read to the cache memory in the file system control unit 206si through the virtual device 209si.

Furthermore, the file system control unit 206si reads the i-node number corresponding to file c from the entries of the directory files retrieved from block 43. According to the read number, a request to refer to block 57 storing the i-node corresponding to file b is issued (read inode for file c of (d) in FIG. 13, and S19 in FIG. 14). As in referring to block 21 or 43, the virtual device 209si reads block 57 of a new version in the update buffer unit 204 (S20 in FIG. 14), and the data is read to the cache memory in the file system control unit 206si through the virtual device 209si.

The obtained reference result is returned from the file system control unit 206si to the application unit 210si operated in the slave host device 201si through the data access control unit 207si (S21 in FIG. 14).

Delayed updating operation from the update buffer unit 204 to the file system unit 203

Figure 15:
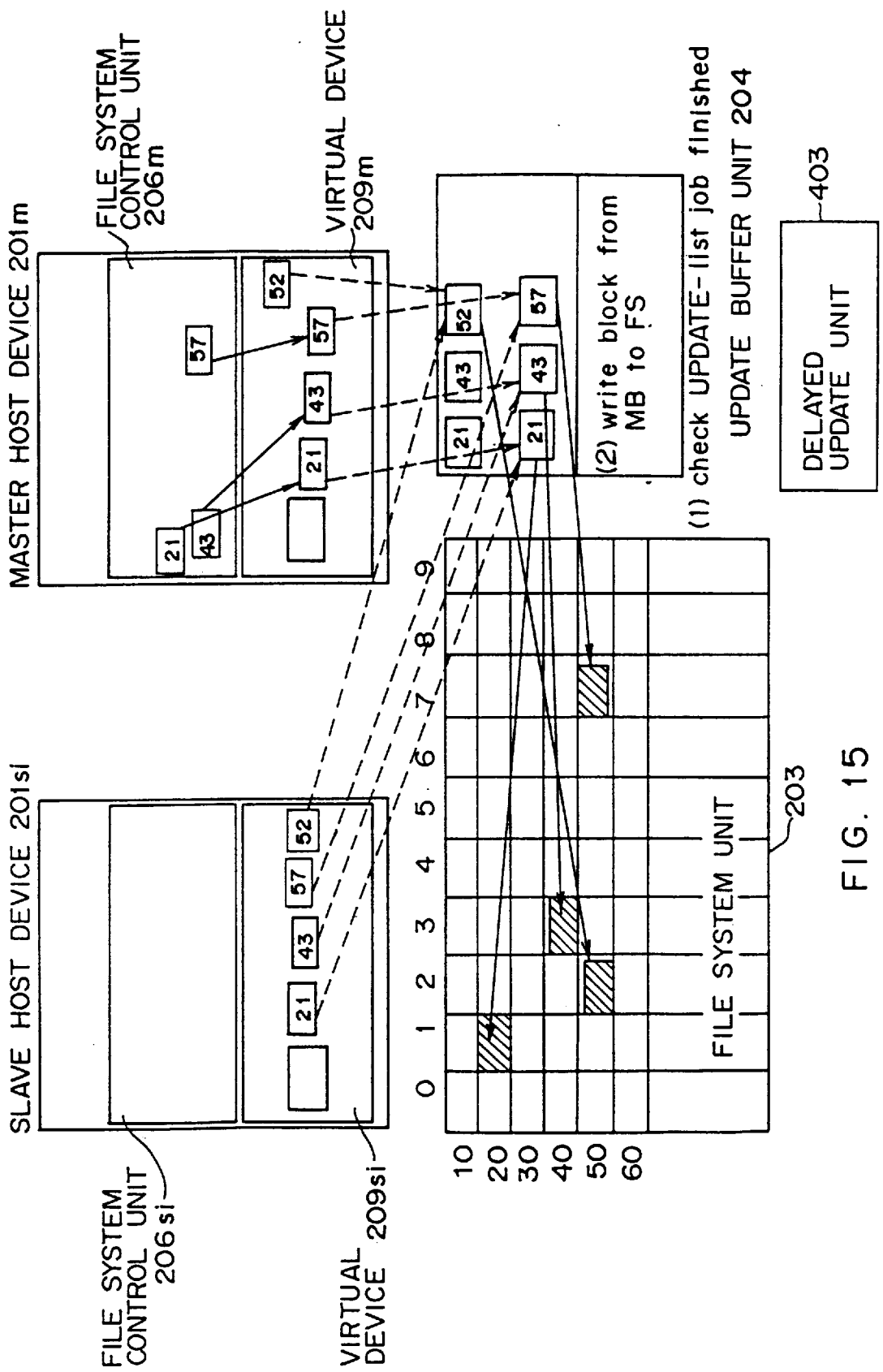
FIG. 15 shows the delayed updating operation (1) from the update buffer unit to the file system unit in the master host device.
Figure 16:
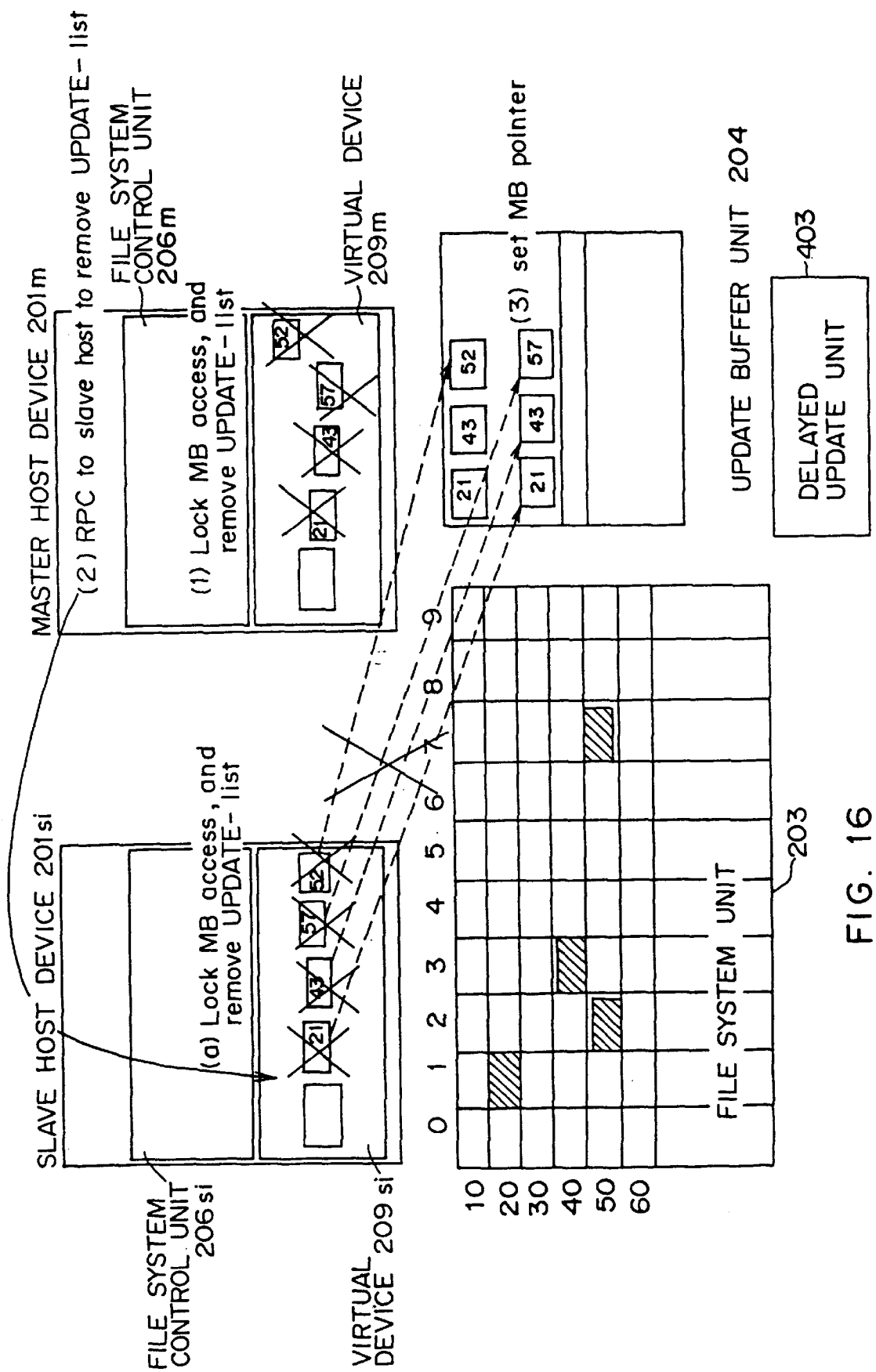
FIG. 16 shows the delayed updating operation (2) from the update buffer unit to the file system unit in the master host device.

The detailed delayed updating operation from the update buffer unit 204 to the file system unit 203 is described by referring to the explanatory views in FIGS. 15 and 16.

FIG. 15 shows the state following the states shown in FIG. 13.

The delayed updating operation performed on the updated predetermined data from the update buffer unit 204 to the file system unit 203 is executed by the delayed update unit 403m (FIG. 4) in the virtual device 209m in the master host device 201m when, for example, the storage capacity in the update buffer unit 204 is equal to or smaller than a predetermined value, when the processor in the master host device 201m is in an idle state, when the memory usage in the file system control unit 206m has reached a predetermined value, or when no access request has been received from the file system control unit 206m for a predetermined time, etc.

The delayed update unit 403m first checks whether or not the data access control unit 207m has completed processing the above described location change notification in the range in the update buffer unit 204 where the delayed updating operation should be performed (check UPDATE-list job finished of (1) in FIG. 15). This check ensures the virtual devices 209 in all host devices 201 work on access to the block to be processed in the delayed update in the update buffer unit 204.

The delayed update unit 403m lists the location data of the latest version, of the data on the location list in the location list unit 402m, in each block stored in the update buffer unit 204. In the example shown in FIG. 15, the location data of the latest version in blocks 21 and 43 and the location data in blocks 52 and 57 are listed.

Then, based on the update buffer position and file system position (FIG. 5) contained in the listed location data, the delayed update unit 403m writes the block in the update buffer unit 204 corresponding to each location data to the storage position in the file system unit 203 corresponding to each location data, through the device driver unit 211m and the SCSI bus 205 (write block from MB to FS of (2) in FIG. 15). In the example shown in FIG. 15, blocks 21, 43, 52, and 57 are transferred from the update buffer unit 204 to the file system unit 203.

FIG. 16 shows the state following the states shown in FIG. 15.

After prohibiting the update buffer unit 204 from being accessed by other units, the delayed update unit 403m in the virtual device 209m in the master host device 201m deletes from the location list stored in the location list unit 402m all location data containing, as the file system position, the value of the file system position in the listed location data (Lock MB access, and remove UPDATE-list of (1) in FIG. 16). As a result, the location data of all versions corresponding to the predetermined data completely transferred to the file system unit 203 from the update buffer unit 204 are deleted from the location list. In the example shown in FIG. 16, the location data of two versions of blocks 21 and 43, and the location data of one version of blocks 52 and 57, are deleted from the location list.

Then, the delayed update unit 403m requests the data access control unit 207m to issue a location change notification requesting the deletion, from the location list, of all versions of location data completely transferred from the update buffer unit 204 to the file system unit 203. In response to the request, the data access control unit 207m sends the location change notification to the slave host devices 201s1 through 201sn through the network 202 (RPC to slave host to remove UPDATE-list of (2) in FIG. 16).

Upon receipt of the location change notification, the version transition unit 208si in the slave host device 201si prohibits the update buffer unit 204 from being accessed by other units and deletes from the location list stored in the location list unit 402si in the virtual device 209si all location data containing, as the file system position, the value of the file system position in the location data provided by the location change notification (Lock MB access, and remove UPDATE-list of (a) in FIG. 16). As a result, the location data of all versions corresponding to the predetermined data completely transferred to the file system unit 203 from the update buffer unit 204 are deleted from the location list. In the example shown in FIG. 16, the location data of two versions of blocks 21 and 43, and the location data of one version of blocks 52 and 57, are deleted from the location list.

As a result, the destination in which each block is accessed by the slave host device 201si is changed from the update buffer unit 204 to the file system unit 203.

Other Operation Examples

When new data addition requests are issued from the application unit 210m in the master host device 201m, or the application unit 210si in the slave host device 201si, to the shared file in the file system unit 203, the master host device 201m collectively processes the requests as parts of update requests.

In this case, in the master host device 201m, the file system control unit 206m receives the data addition request from the data access control unit 207m, updates the contents of the block storing the i-node of the directory file relating to the object file, the block storing the directory file data, and the block storing the i-node of the object file, and then reserves an idle block in the file system unit 203 to write data therein.

Then, the read control unit in the access switching unit 401m in the virtual device 209m writes the updated block to the update buffer unit 204, and correspondingly updates the location list in the location list unit 402.

The data access control unit 207m sends the location change notification of the updated location list to all slave host devices 201sl through 201sn through the network 202.

The system can be designed such that, only in response to such update requests to change the structures of the files system as change the structure of the directory and generate a file, the master host device 201m collectively processes the requests and writes the update results to the update buffer unit 204, and that, in response to the file update requests to add data blocks to existing files, the slave host device 201si writes the update results directly to the file system unit 203 through the SCSI bus 205, not through the master host device 201m. In this design, the file data versions cannot be managed, but the concentration of updating processes on the master host device 201m can be prevented without reducing the reliability of the structure of the file system.

<Other Embodiments>

As described above, the update buffer unit 204 can hold a plurality of versions for a set of predetermined data (block data) in the file system unit 203.

Taking advantage of this feature, the master host device 201m can be provided with the function of reflecting the data of the update buffer unit 204 in the file system unit 203 when a failure occurs in the master host device 201m, and when the master host device 201m is under recovery.

Furthermore, according to the present invention, the master host device 201m can be provided with the function of accessing the data of any version stored in the update buffer unit 204.

A backup master host device 201m can be connected to the network 202 to ensure the consistency of the file system unit 203 by allowing the function of controlling the update buffer unit 204 to be taken over by the backup master host device 201m when a main master host device 201m fails.

According to the present invention, the file system unit 203 and update buffer unit 204 can be designed as multiple units to improve the reliability of the entire system.

When a host device writes local data not shared by a plurality of host devices to a file system not through a master host device, the local data can be improved in reliability with the versions properly managed by allowing the data to be written to the update buffer unit provided exclusively for the host device.

According to the present invention, the concentration of the data access is processed by the first data processing device exclusively for updating predetermined shared data. In referring to the predetermined shared data, parallel access to the shared data can be realized without a lock mechanism, by assigning the destination in which the data is accessed to either the shared storage device or the update storage device according to the concept of the transition of data versions.

Since the predetermined shared data updating unit in the first data processing device and the predetermined shared data referring unit in the second data processing device can be realized as the functions of conventional file systems, the functions of the present invention can be easily added to the conventional network system.

If the first data processing device is designed as including all functions of the second data processing device, the first data processing device and second data processing device can both be connected to the network.

Furthermore, if a request to update predetermined shared data is issued as a request to update the system data (directory data and i-node of a directory and a file) regulating the structure of the file system other than the file data in the file system stored in the shared storage device, then the user can prevent update requests from being concentrated on the first data processing device.

Otherwise, if the request to update predetermined shared data is issued as a request to update either the file data or the system data, which is other than the file data and regulates the structure of the file system, in the file system stored in the shared storage device, then the reliability of the shared data can be improved by the largest possible extent.

According to the second aspect of the present invention, the shared data in the shared storage device can be easily restored to its normal state using the predetermined shared data stored in the update storage device when a failure occurs in a host device.

According to the third aspect of the present invention, predetermined shared data of plural versions stored in the update storage device can be freely accessed.

According to the fourth aspect of the present invention, the first data processing device for backup successfully takes over the functions of controlling the update storage device when a failure occurs in a host device.

According to the fifth aspect of the present invention, designing the update storage device as a ring buffer simplifies the control of the update storage device by the version data writing unit and delayed update unit.

What is claimed is:

1. A shared data processing device provided in a first data processing device sharing a bus through which data is accessed in one of a shared storage device and an update storage device, and forming at least one of a plurality of data processing devices interconnected through a network, comprising:

first predetermined shared data access control means for accepting a request from another data processing device through the network to update predetermined shared data in the shared storage device or a request generated in the first data processing device to update the predetermined shared data;

predetermined shared data updating means for updating the predetermined shared data in response to the request to update the predetermined shared data accepted by said first predetermined shared data access control means;

version data writing means for writing to the update storage device a version of the predetermined shared data updated by said predetermined shared data updating means;

delayed update means for writing at a predetermined timing a predetermined version of the predetermined shared data stored in the update storage device to a storage position corresponding to the predetermined shared data in the shared storage device;

first update state management means for managing an update state of the predetermined shared data in the update storage device; and update state notification means for notifying the plurality of data processing devices through the network of the update state of the predetermined shared data in the update storage device managed by said first update state management means.

2. The shared data processing device according to claim 1, wherein said request to update the predetermined shared data is issued to update system data regulating the structure of a file system other than file data in the file system stored in the shared storage device.

3. The shared data processing device according to claim 1, wherein said request to update the predetermined shared data is issued to update file data in a file system stored in the shared storage device, or the system data, other than the file data, regulating the structure of a file system.

4. A shared data processing device provided in a second data processing device sharing a bus through which data is accessed in one of a shared storage device and an update storage device, and forming at least one of a plurality of data processing devices interconnected through a network, comprising:

second predetermined shared data access control means for sending a request to update predetermined shared data to a first data processing device through the network when a request generated in the second data processing device to access the shared storage device is the request to update the predetermined shared data, and accepting a request to refer to the predetermined shared data when the request to access the shared storage device is the request to refer to the predetermined shared data;

predetermined shared data referring means for referring to the predetermined shared data in response to the request to refer to the predetermined shared data accepted by said second predetermined shared data access control means;

second update state management means for managing an update state of the predetermined shared data received from said first data processing device through the network and stored in the update storage device; and predetermined shared data reference control means for issuing from the second data processing device directly through the bus a request to refer to the predetermined shared data, by said predetermined shared data referring means, stored in either the shared storage device or update storage device depending on the update state of the predetermined shared data in the update storage device managed by said second update state management means.

5. A shared data processing system in which a plurality of data processing devices share a bus through which a second data processing device and an update storage device are accessed and are interconnected through a network, comprising:

in a first data processing device forming at least one of the plurality of data processing devices, first predetermined shared data access control means for accepting a request from another data processing device through the network to update predetermined shared data in the shared storage device or a request generated in the first data processing device to update the predetermined shared data;

predetermined shared data updating means for updating the predetermined shared data in response to the request to update the predetermined shared data accepted by said first predetermined shared data access control means;

version data writing means for writing to the update storage device a version of the predetermined shared data updated by said predetermined shared data updating means;

delayed update means for writing at a predetermined timing a predetermined version of the predetermined shared data stored in the update storage device to a storage position corresponding to the predetermined shared data in the shared storage device;

first update state management means for managing an update state of the predetermined shared data in the update storage device; and update state notification means for notifying the plurality of data processing devices through the network of the update state of the predetermined shared data in the update storage device managed by said first update state management means, and in a second data processing device forming at least one of the plurality of data processing devices:

second predetermined shared data access control means for sending a request to update predetermined shared data to the first data processing device through the network when a request generated in the second data processing device to access the shared storage device is the request to update the predetermined shared data, and accepting a request to refer to the predetermined shared data when the request to access the shared storage device, is the request to refer to the predetermined shared data;

predetermined shared data referring means for referring to the predetermined shared data in response to the request to refer to the predetermined shared data accepted by said second predetermined shared data access control means;

second update state management means for managing an update state of the predetermined shared data received from said first data processing device through the network and stored in the update storage device; and predetermined shared data reference control means for issuing from the second data processing device directly through the bus a request to refer to the predetermined shared data, by said predetermined shared data referring means, stored in either the shared storage device or update storage device depending on the update state of the predetermined shared data in the update storage device managed by said second update state management means.

6. The shared data processing system according to claim 5, wherein said first data processing device includes all functions of said second data processing device.

7. The shared data processing system according to claim 5 further comprising:

recovery means for restoring the predetermined shared data in the shared storage device to an original state using the predetermined shared data stored in the update storage device when said first data processing device fails.

8. The shared data processing system according to claim 5 further comprising:

version data accessing means for accessing any of a plurality of versions of the predetermined shared data stored in the update storage device.

9. The shared data processing system according to claim 5, wherein when a plurality of first data processing devices are connected to the network and an active unit of the plurality of first data processing devices fails, another first data processing device takes over a function of controlling the update storage device.

10. The shared data processing system according to claim 5, wherein said update storage device comprises a ring buffer;

said version data writing means writes the predetermined shared data to the ring buffer, which is the update storage device, only as additional data; and said delayed update means is activated depending on an amount of the predetermined shared data written to the ring buffer, which is the update storage device.

11. A shared data processing device, coupled via a network to a shared storage device, an update storage device, and a plurality of data processing devices, comprising:

an access control unit to accept a request from one of the data processing devices via the network to update shared data in the shared storage device and a request generated in said shared data processing device to update the shared data;

an update process unit to process the request to update the shared data, accepted by said access control unit;

version update unit to write to the update storage device a first version of the shared data updated by said update unit;

a delayed update unit to write with a predetermined timing, a subset of the shared data stored in the update storage device at a storage position corresponding to the subset of the shared data in the shared storage device;

an update state management unit to manage an update state of the shared data in the update storage device; and an update state notification unit to notify the data processing devices via the network of the update state of the shared data in the update storage device managed by said update state management unit.

* * * * *